(12) United States Patent
Kim et al.

(10) Patent No.: US 11,460,817 B2
(45) Date of Patent: Oct. 4, 2022

(54) APPARATUS FOR MANAGING FABRIC AND METHOD FOR OPERATING THE APPARATUS

(71) Applicant: LG Electronics Inc., Seoul (KR)

(72) Inventors: Mi Rae Kim, Gyeonggi-do (KR); Sang Oh Kim, Seoul (KR); Jun Sang Yun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 16/698,313

(22) Filed: Nov. 27, 2019

(65) Prior Publication Data
US 2020/0096954 A1    Mar. 26, 2020

(30) Foreign Application Priority Data
Jun. 28, 2019 (KR) .................. 10-2019-0078029

(51) Int. Cl.
*G06T 7/00* (2017.01)
*G05B 13/02* (2006.01)
(Continued)

(52) U.S. Cl.
CPC ........... *G05B 13/027* (2013.01); *D06F 33/00* (2013.01); *D06F 58/30* (2020.02); *G06T 7/0002* (2013.01);
(Continued)

(58) Field of Classification Search
CPC ....... G05B 13/027; D06F 33/00; D06F 58/30; D06F 2103/02; D06F 34/05; D06F 34/32;
(Continued)

(56) References Cited

U.S. PATENT DOCUMENTS

2016/0071322 A1* 3/2016 Nishiyama ............. G06T 19/00
345/632
2017/0350067 A1* 12/2017 Choi ...................... D06F 73/02
(Continued)

FOREIGN PATENT DOCUMENTS

CN    108866934 A  * 11/2018   ............. D06F 33/00
CN    110924052 A  *  3/2020
(Continued)

*Primary Examiner* — Van D Huynh
(74) *Attorney, Agent, or Firm* — Fish & Richardson P.C.

(57) ABSTRACT

The present disclosure relates to a clothes treating apparatus that operates by executing an artificial intelligence (AI) algorithm and/or a machine learning algorithm in a 5G environment connected for Internet of Things, and a method for operating the clothes treating apparatus. The method for operating the clothes treating apparatus includes acquiring a clothing image by using a camera to photograph a user wearing clothes and standing in front of a mirror display placed on a front surface of the clothes treating apparatus, analyzing the clothing image, setting an operation mode of the clothes treating apparatus according to the result of analyzing the clothing image, and causing the clothes treating apparatus to operate according to the set operation mode. It is possible to improve user satisfaction by automatically setting and activating an operation mode of a clothes treating apparatus based on clothing image information.

20 Claims, 12 Drawing Sheets

(51) Int. Cl.
*H04N 5/232* (2006.01)
*D06F 33/00* (2020.01)
*D06F 58/30* (2020.01)
*G06V 10/10* (2022.01)
*G06V 40/10* (2022.01)
*G06V 40/16* (2022.01)
*D06F 103/02* (2020.01)

(52) U.S. Cl.
CPC .............. *G06V 10/10* (2022.01); *G06V 40/103* (2022.01); *G06V 40/161* (2022.01); *H04N 5/23219* (2013.01); *D06F 2103/02* (2020.02); *G06T 2207/20081* (2013.01); *G06T 2207/20084* (2013.01); *G06T 2207/30196* (2013.01)

(58) Field of Classification Search
CPC .......... D06F 58/10; D06F 33/32; D06F 58/36; D06F 34/18; G06T 7/0002; G06T 2207/20081; G06T 2207/20084; G06T 2207/30196; G06V 10/10; G06V 40/103; G06V 40/161; G06V 10/454; G06V 10/82; G06V 40/169; H04N 5/23219; H04N 2005/2726
USPC .......................................................... 700/275
See application file for complete search history.

(56) References Cited

U.S. PATENT DOCUMENTS

2019/0385017 A1* 12/2019 Hwang .................. D06F 33/36
2021/0140091 A1*  5/2021 Choi ....................... D06F 34/18

FOREIGN PATENT DOCUMENTS

KR      10-0370363       1/2003
KR      10-1954032       2/2019

* cited by examiner

APPARATUS FOR MANAGING FABRIC AND METHOD FOR OPERATING THE APPARATUS

CROSS-REFERENCE TO RELATED APPLICATION

This application claims benefit of priority to Korean Patent Application No. 10-2019-0078029, filed on Jun. 28, 2019, the entire disclosure of which is incorporated herein by reference.

BACKGROUND

1. Technical Field

The present disclosure relates to an apparatus for managing fabric and a method for operating the apparatus. More particularly, the present disclosure relates to a clothes treating apparatus that automatically sets and activates an operation mode of the clothes treating apparatus based on clothing image information, and a method for operating the clothes treating apparatus.

2. Description of Related Art

A clothes treating apparatus collectively refers to apparatuses that supply water to a treatment chamber housing clothes in order to remove contaminants from the clothes, supply dry air to dry wet clothes, or ventilate air or supply steam to refresh the clothes (for example, to remove creases or odors).

Particularly, technologies for housing and treating clothes in a clothes treating apparatus are disclosed in Korean Patent Registration No. 10-1954032 (hereinafter referred to as "Related Art 1" and Korean Patent Registration No. 10-0370363 (hereinafter referred to as "Related Art 2".

Related Art 1 discloses an apparel cleaning management system capable of easily and efficiently performing drying, sterilization, and anti-creasing of clothes housed therein at the same time, by supplying steam to the clothes and drying the clothes using a moving hanger. However, there is an inconvenience in that a user is required to set an operation mode and select a start button in order to operate the apparel cleaning management system.

Related Art 2 discloses a technology relating to a multi-purpose clothes dryer capable of removing creases in clothes by supplying hot and humid air when drying the clothes, sterilizing and deodorizing the clothes, and also being used as a wardrobe when necessary. However, there is an inconvenience in that a user is required to set an operation mode and select a start button in order to operate the clothes dryer.

The above description regarding the related art is technical information that the inventor holds for the derivation of the present disclosure or learned in the process of deriving the present disclosure, and cannot thus be said to be technical information known to the public prior to the filing of the present disclosure.

(Related Art 1) Korean Patent Registration No. 10-1954032 (registered on Feb. 25, 2019)

(Related Art 2) Korean Patent Registration No. 10-0370363 (registered on Jan. 16, 2003)

SUMMARY OF THE INVENTION

The present disclosure is directed to addressing the shortcomings discussed above in which a user is required to set an operation mode and select a start button in order to operate a clothes treating apparatus.

The present disclosure is further directed to improving user convenience by automatically setting and activating an operation mode of a clothes treating apparatus based on clothing image information.

The present disclosure is still further directed to improving user satisfaction in using a clothes treating apparatus by recommending clothes to the user based on facial and body type information of the user.

The present disclosure is still further directed to improving user satisfaction in using a clothes treating apparatus by recommending clothes to a user based on facial and body type information of the user and weather information.

The present disclosure is still further directed to improving user convenience by automatically setting and activating an operation mode of a washing machine and a clothes dryer interworking with a clothes treating apparatus through a network.

The present disclosure is still further directed to addressing the shortcomings discussed above in which a user is required to set an operation mode and select a start button in order to operate a clothes treating apparatus, by using optimal processor resources.

Embodiments of the present disclosure are not limited to what has been described above. A person skilled in the art may clearly understand, from the following description, other aspects not mentioned. Further, it will be readily appreciated that the present disclosure may be realized by features and combinations thereof as disclosed in the claims.

A method for operating a clothes treating apparatus according to an embodiment of the present disclosure may include automatically setting and activating an operation mode of the clothes treating apparatus based on clothing image information.

Specifically, the method for operating a clothes treating apparatus may include acquiring, by a camera, a clothing image corresponding to a user that wears clothes and that is located in front of a mirror display, the mirror display being located at a front surface of the clothes treating apparatus, analyzing the clothing image, setting an operation mode of the clothes treating apparatus according to a result of analyzing the clothing image, and causing the clothes treating apparatus to operate according to the operation mode.

Through the method for operating a clothes treating apparatus according to this embodiment of the present disclosure, it is possible to automatically set and activate an operation mode of the clothes treating apparatus based on clothing image information. Thus, it is possible to improve the user's satisfaction in using the clothes treating apparatus.

Further, the acquiring the clothing image may include determining whether the user is facing the clothes treating apparatus, and capturing an image of the user based on a determination that the user has been facing the clothes treating apparatus for a predetermined period of time or more.

Furthermore, the determining whether the user faces the clothes treating apparatus may include determining whether the user faces the clothes treating apparatus based on detection of the user's face.

Through the act of acquiring a clothing image and the act of determining whether the user in front of the mirror display is facing the clothes treating apparatus, photographs may be taken from the inside and the outside of the clothes treating apparatus. Thus, it is possible to more precisely control operations of the clothes treating apparatus.

In addition, the analyzing the clothing image may include determining a type of the clothes from the clothing image by a deep neural network model that is pre-trained to identify the clothes from the clothing image and determine the type of the clothes, and setting the operation mode comprises setting the operation mode according to the type of the clothes.

Further, the analyzing the clothing image may include analyzing the clothing image comprises determining a material of the clothes from the clothing image by a deep neural network model that is pre-trained to identify the clothes from the clothing image and determine the material of the clothes, and setting the operation mode comprises setting the operation mode according to the material of the clothes.

Furthermore, analyzing the clothing image may include determining a degree of contamination of the clothes from the clothing image by a deep neural network model that is pre-trained to identify the clothes from the clothing image and determine the degree of contamination of the clothes, and setting the operation mode comprises setting the operation mode according to the degree of contamination of the clothes.

Through the act of analyzing the clothing image and the act of setting an operation mode of the present embodiment, an operation mode of the clothes treating apparatus can be more precisely set according to the type of the clothes, the material of the clothes, and the degree of contamination of the clothes from the clothing image. Thus, it is possible to acquire a satisfactory product of the clothes treating.

In addition, the setting the operation mode may include setting a wash mode of a washing machine that is configured to communicate with the clothes treating apparatus and to wash the clothes according to the result of analyzing the clothing image.

Further, setting the operation mode may further include setting a dry mode of a clothes dryer that is configured to communicate with the clothes treating apparatus and the washing machine and to dry the clothes taken out of the washing machine according to the result of analyzing the clothing image.

Through the act of setting an operation mode of the present embodiment, the clothes treating apparatus can automatically setting a wash mode of the washing machine and/or a dry mode of the clothes dryer. Thus, the user only needs to put clothes into the washing machine and/or the clothes dryer, and the washing machine and/or the clothes dryer automatically washes and/or dries the clothes. Therefore, it is possible to improve the user's convenience.

Furthermore, the method for operating a clothes treating apparatus may further include acquiring one or more images of the user corresponding to a facial type and a body type of the user, analyzing the one or more images of the user, and recommending user-customized clothes based on a result of analyzing the one or more images of the user.

According to the method for operating a clothes treating apparatus of the present embodiment, it is possible to recommend clothes to the user based on facial and body type information of the user. Thus, it is possible to improve the user's satisfaction in using the clothes treating apparatus.

In addition, the method for operating a clothes treating apparatus may further include recommending the user-customized clothes comprises recommending the user-customized clothes based on the result of analyzing the one or more images of the user and the weather information.

According to the method for operating a clothes treating apparatus of the present embodiment, it is possible to recommend clothes to the user based on the facial and body type information of the user and the weather information. Thus, it is possible to improve the user's satisfaction in using the clothes treating apparatus.

A clothes treating apparatus according to another embodiment of the present disclosure may include a mirror display located at a front surface of the clothes treating apparatus, and one or more processors configured to acquire, by a camera, a clothing image corresponding to a user that wears clothes and that is located in front of the mirror display, analyze the clothing image, set an operation mode of the clothes treating apparatus according to a result of analyzing the clothing image, and cause the clothes treating apparatus to operate according to the operation mode.

According to the clothes treating apparatus of an embodiment of the present disclosure, it is possible to automatically set and activate an operation mode of the clothes treating apparatus based on clothing image information. Thus, it is possible to improve the user's satisfaction in using the clothes treating apparatus.

Further, the one or more processors may be configured to determine whether the user is facing the clothes treating apparatus, and capture an image of the user based on a determination that the user has been facing the clothes treating apparatus for a predetermined period of time or more.

Further, the one or more processors may be configured to determine whether the user is facing the clothes treating apparatus based on detection of the user's face.

Through the one or more processors of the present embodiment, photos can be taken from the inside and the outside of the clothes treating apparatus. Thus, it is possible to more precisely control operations of the clothes treating apparatus.

Also, the one or more processors may be configured to determine a type of the clothes from the clothing image by a deep neural network model that is pre-trained to identify the clothes from the clothing image and determine the type of the clothes, and set the operation mode according to the type of the clothes Further, the one or more processors may be configured to determine a material of the clothes from the clothing image by a deep neural network model that pre-trained to identify the clothes from the clothing image and determine the material of the clothes, and set the operation mode according to the material of the clothes.

Furthermore, the one or more processors may be configured to determine a degree of contamination of the clothes from the clothing image by a deep neural network model that is pre-trained to identify the clothes from the clothing image and determine the degree of contamination of the clothes, and set the operation mode of the clothes treating apparatus according to the degree of contamination of the clothes.

Through the one or more processors of the present embodiment, an operation mode of the clothes treating apparatus can be more precisely set according to the type of the clothes, the material of the clothes, and the degree of contamination of the clothes from the clothing image. Thus, it is possible to acquire a satisfactory product of the clothes treating.

In addition, the one or more processors may be configured to set a wash mode of a washing machine that is configured to communicate with the clothes treating apparatus and to wash the clothes according to the result of analyzing the clothing image.

Further, the one or more processors may be configured to set a dry mode of a clothes dryer that is configured to communicate with the clothes treating apparatus and the washing machine and to dry the clothes taken out of the washing machine according to the result of analyzing the clothing image.

Through the one or more processors of the present embodiment, the clothes treating apparatus can automatically set a wash mode of the washing machine and/or a dry mode of the clothes dryer. Thus, the user only needs to put clothes into the washing machine and/or the clothes dryer, and the washing machine and/or the clothes dryer automatically washes and/or dries the clothes. Therefore, it is possible to improve the user's convenience.

Furthermore, the one or more processors may be configured to acquire one or more images of the user corresponding to a facial type and a body type of the user, analyzes the one or more images of the user, and recommend user-customized clothes based on a result of analyzing the one or more images of the user.

According to the clothes treating apparatus of the present embodiment, it is possible to recommend clothes to the user based on facial and body type information of the user. Thus, it is possible to improve the user's satisfaction in using the clothes treating apparatus.

20항 In addition, the one or more processors may be configured to collect weather information, and recommend the user-customized clothes based on the result of analyzing the one or more images of the user and the weather information.

According to the clothes treating apparatus of the present embodiment, it is possible to recommend clothes to the user based on the facial and body type information of the user and the weather information. Thus, it is possible to improve the user's satisfaction in using the clothes treating apparatus.

In addition to the embodiments described above, another method and another system for implementing the present disclosure, and a computer program for executing the method, may be further provided.

The above and other aspects, features, and advantages of the present disclosure will become more apparent from the following drawings, claims, and detailed description of the invention.

According to embodiments of the present disclosure, it is possible to improve user satisfaction by automatically setting and activating an operation mode of a clothes treating apparatus based on clothing image information.

Further, it is possible to improve user satisfaction in using a clothes treating apparatus by recommending clothes to a user based on facial and body type information of the user.

Furthermore, it is possible to improve user satisfaction of a clothes treating apparatus by recommending clothes to a user based on facial and body type information of the user and weather information.

In addition, it is possible to improve user convenience by automatically setting and activating an operation mode of a washing machine and a clothes dryer interworking with a clothes treating apparatus through a network.

Although a clothes treating apparatus is a mass-produced and uniform product, a user may perceive the clothes treating apparatus as his or her personalized apparatus. Therefore, the clothes treating apparatus may produce an effect of a user-customized product.

Further, it is possible to improve the power efficiency of a clothes treating apparatus by automatically setting and activating an operation mode of the clothes treating apparatus based on clothing image information with optimal processor resources.

However, the present disclosure is not limited to the above-described effects. A person skilled in the art may clearly understand, from the following description, other effects not mentioned herein.

BRIEF DESCRIPTION OF THE DRAWINGS

The foregoing and other aspects, features, and advantages of the disclosure, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

The above and other aspects, features, and advantages of the present disclosure will become apparent from the detailed description of the following aspects in conjunction with the accompanying drawings, in which.

DETAILED DESCRIPTION

Figure 1:
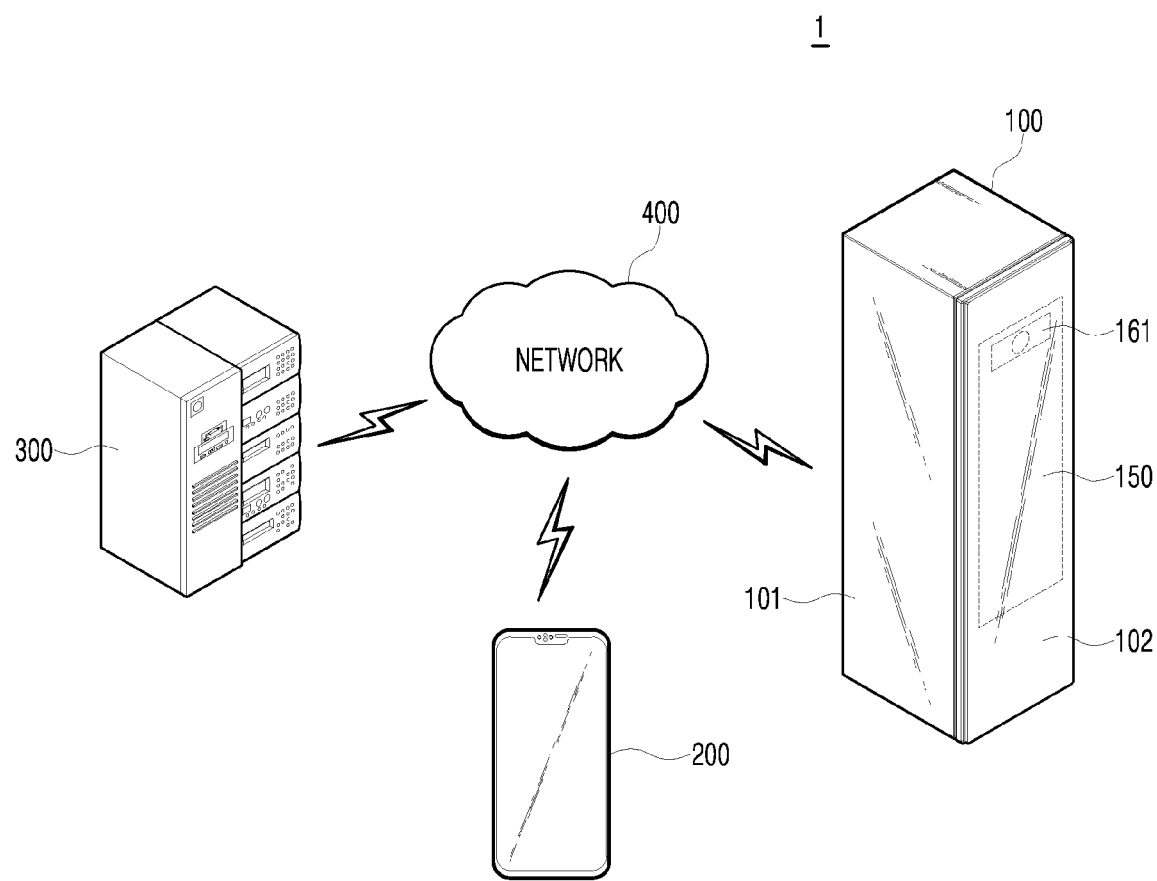
FIG. 1 is a diagram illustrating an example of a clothes treating environment including a clothes treating apparatus, a user device, a server, and a network connecting these to each other, according to an embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims. In relation to describing the present disclosure, when the detailed description of the relevant known technology is determined to unnecessarily obscure the gist of the present disclosure, the detailed description may be omitted.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Hereafter, embodiments of the present disclosure will be described in detail with reference to the accompanying drawings. In the drawings, components similar or corresponding to each other will be assigned similar reference numerals, and redundant descriptions thereof will be omitted.

FIG. 1 is a diagram illustrating an example of a clothes treating environment including a clothes treating apparatus, a user device, a server, and a network connecting these to each other, according to an embodiment of the present disclosure. Referring to FIG. 1, a clothes treating environment 1 may include a clothes treating apparatus 100, a user device 200, a server 300, and a network 400.

The clothes treating apparatus 100 may supply water to a treatment chamber (103 in FIG. 2) housing clothes in order to remove contaminants from the clothes, supply dry air to dry wet clothes, or ventilate air or supply steam to refresh the clothes (for example, to remove creases or odors).

The clothes treating apparatus 100 may include an air circulation system (not illustrated) configured to supply dry air to the treatment chamber, circulate air discharged from the treatment chamber along a circulation flow path formed outside the treatment chamber, and supply the air to the treatment chamber again. Further, the clothes treating apparatus 100 may include a heat pump on the circulation flow path, and the circulated air may thus be heated, cooled, or dehumidified according to a selected operation course and then supplied to the treatment chamber.

Further, the clothes treating apparatus 100 may dehumidify the treatment chamber using a dry function. If the dry function is performed while the door is open, the air of a room may be introduced into the circulation flow path through the treatment chamber, dehumidified by the heat pump, and then discharged to the room through the treatment chamber.

In the present embodiment, the clothes treating apparatus 100 may acquire a clothing image by photographing a user wearing clothes and standing in front of a mirror display on a front surface of the clothes treating apparatus 100, analyze the clothing image, automatically set an operation mode of the clothes treating apparatus 100 according to the result of analyzing the clothing image, and cause the clothes treating apparatus to operate according to the set operation mode.

When the operation mode is set, the clothes treating apparatus 100 may use at least one among a deep neural network model which has been previously trained to identify the clothes from the clothing image and determine a type of the clothes for analyzing the type of the clothes, a deep neural network model which has been previously trained to identify the clothes from the clothing image and determine a material of the clothes for analyzing the material of the clothes, and a deep neural network model which has been previously trained to identify the clothes from the clothing image and determine the degree of contamination of the clothes for analyzing the degree of contamination of the clothes.

Further, the clothes treating apparatus 100 may acquire and analyze facial and body type images of the user, and recommend user-customized clothes based on the result of analyzing the facial and body type images of the user. Herein, the user-customized clothes may be recommended by analyzing clothing images stored in a memory (170 in FIG. 4). In a selective embodiment, the clothes treating apparatus 100 may recommend user-customized clothes based on weather information. To this end, the clothes treating apparatus 100 may collect weather information from a weather server (not illustrated) that provides weather information, and the clothes treating apparatus 100 may communicate with the weather server through the network 400.

If the user device 200 accesses a clothes treating apparatus drive application or a clothes treating apparatus drive website and goes through an authentication process, the user device 200 may receive a service for driving or controlling the clothes treating apparatus 100. In the present embodiment, the user device 200 which has completed the authentication process may drive the clothes treating apparatus 100 and control operations of the clothes treating apparatus 100.

In the present embodiment, the user device 200 may be a desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation device, a kiosk, an MP3 player, a digital camera, a home appliance, and any other mobile or immobile computing device which can be manipulated by the user, but is not limited thereto. Further, the user device 200 may be a wearable device, such as a watch, glasses, a head band, and a ring, equipped with communication and data processing functions. The user device 200 is not limited to the above descriptions, and may employ any device capable of web-browsing, without limitation.

The server 300 may be a database server that provides big data required to apply various artificial intelligence algorithms and data required to operate the clothes treating apparatus 100. In addition, the server 300 may include a web server or an application server configured to enable operations of the clothes treating apparatus 100 to be controlled remotely using the clothes treating apparatus drive application or the clothes treating apparatus drive web browser installed in the user device 200.

Herein, artificial intelligence (AI) refers to an area of computer engineering science and information technology that studies methods to make computers mimic intelligent human behaviors such as reasoning, learning, self-improving, and the like.

In addition, AI does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. Specifically, machine learning is a technology that investigates and builds systems, and algorithms for such systems, which are capable of learning, making predictions, and enhancing their own performance on the basis of experiential data. Machine learning algorithms, rather than only executing rigidly-set static program commands, may be used to take an approach that builds models for deriving predictions and decisions from inputted data.

The server 300 may receive, from the clothes treating apparatus 100, the clothing image obtained by photographing the user wearing the clothes and standing in front of the mirror display and analyze the received image. Further, the server 300 may automatically set an operation mode of the clothes treating apparatus 100 according to the result of analyzing the clothing image, and transmit, to the clothes treating apparatus 100, a control signal to operate the clothes treating apparatus 100 according to the set operation mode.

Further, the server 300 may receive, from the clothes treating apparatus 100, facial and body type images of the user, and analyze the received image. In addition, the server 300 may recommend user-customized clothes based on the result of analyzing the facial and body type images of the user, and transmit the recommended clothes to the clothes treating apparatus 100.

When the server 300 sets the operation mode of the clothes treating apparatus 100, the server 300 may use at least one of a deep neural network model which has been previously trained to identify the clothes from the clothing image and determine a type of the clothes for analyzing the type of the clothes, a deep neural network model which has been previously trained to identify the clothes from the clothing image and determine a material of the clothes for analyzing the material of the clothes, and a deep neural network model which has been previously trained to identify the clothes from the clothing image and determine the degree of contamination of the clothes for analyzing the degree of contamination of the clothes.

The network 400 may serve to connect the clothes treating apparatus 100, the user device 200, and the server 300. The network 400 may include wired networks such as local area networks (LANs), wide area networks (WANs), metropolitan area networks (MANs), and integrated service digital networks (ISDNs) or wireless networks such as wireless LANs, CDMA, Bluetooth, and satellite communication, but the scope of the present disclosure is not limited thereto. Further, the network 400 may transmit and receive information using near field communication and/or telecommunication. Herein, the near field communication may include Bluetooth®, radio frequency identification (RFID), infrared data association (IrDA), ultra-wideband (UWB), ZigBee, and wireless fidelity (Wi-Fi) technologies, and the telecommunication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network 400 may include connections among network elements such as hubs, bridges, routers, switches, and gateways. The network 400 may include one or more connected networks, such as a multi-network environment, including public networks such as the Internet and private networks such as a secure enterprise private network. Access to the network 400 may be provided through one or more wired or wireless access networks. Further, the network 400 may support an Internet of Things (IoT) network that exchanges and processes information between distributed components such as objects and/or 5G communication.

Figure 2:
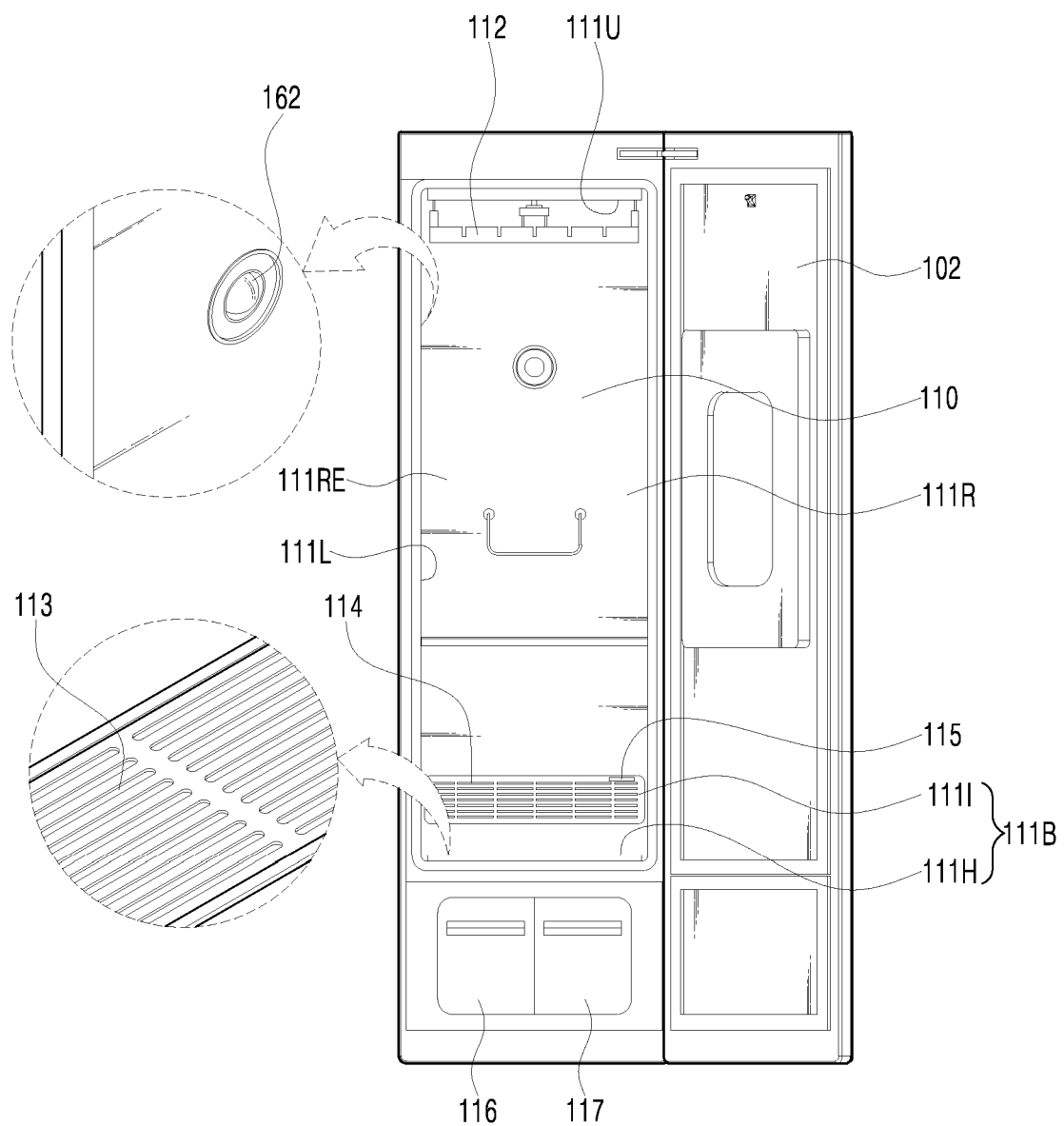
FIG. 2 is a front view of a clothes treating apparatus of which a door is open, according to an embodiment of the present disclosure.
Figure 3:
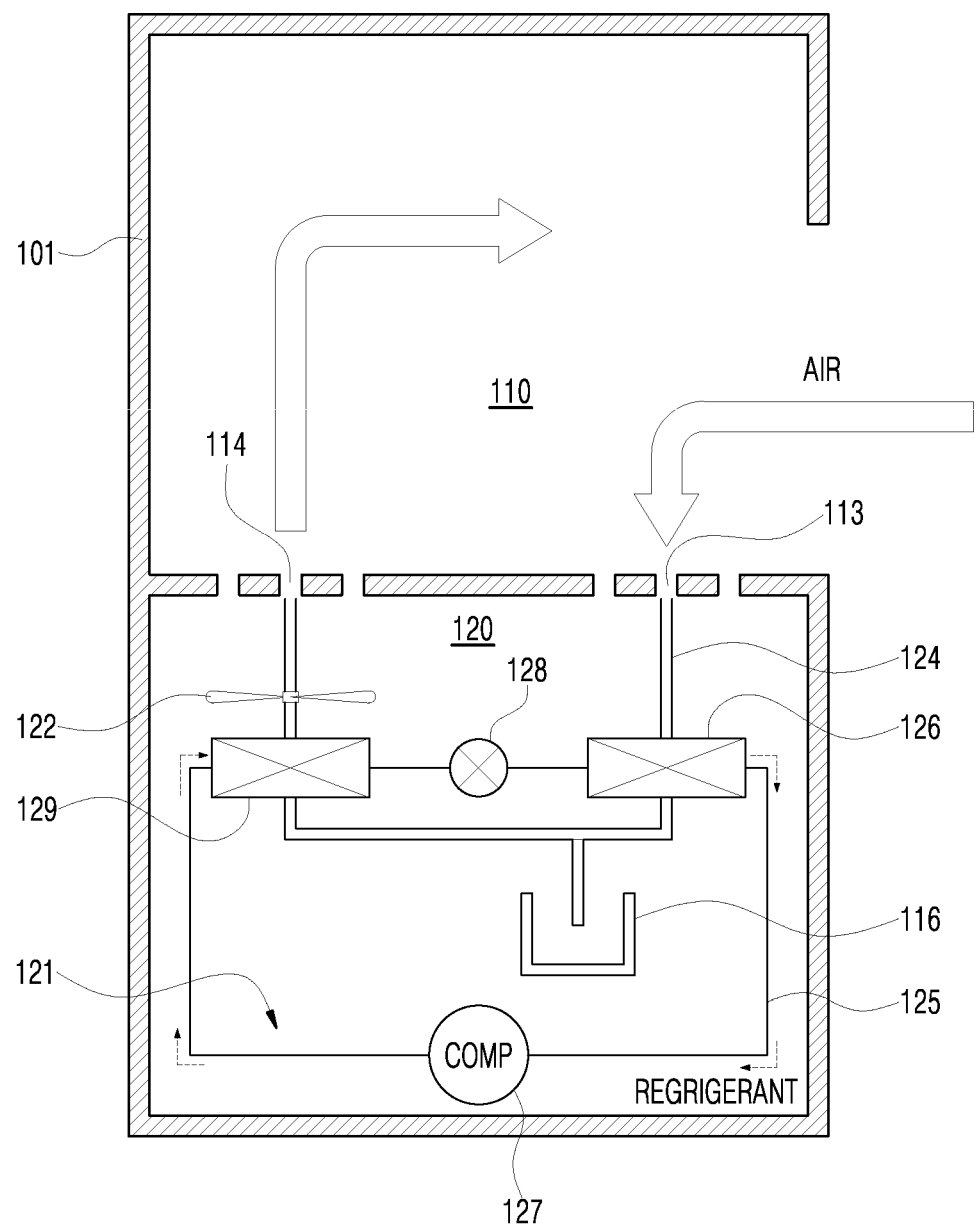
FIG. 3 is a schematic diagram illustrating a clothes treating apparatus according to an embodiment of the present disclosure.

FIG. 2 is a front view of a clothes treating apparatus of which a door is open, according to an embodiment of the present disclosure, and FIG. 3 is a schematic diagram illustrating a clothes treating apparatus according to an embodiment of the present disclosure.

Referring to FIGS. 1 to 3, the clothes treating apparatus 100 may include a cabinet 101 forming a treatment chamber 110 in which clothes are housed, and a door 102 rotatably coupled to the cabinet 101 so as to open and close the treatment chamber 110. The front side of the treatment chamber 110 may be open so as to allow clothes to be inserted therein. An opening (not illustrated) may be formed in a front surface of the cabinet 101, and the treatment chamber 110 may be formed in a space recessed backwards from the opening.

The door 102 is rotatably coupled to one side of the cabinet 101, and may open and close the open front surface of the treatment chamber 110. When the door 102 is closed, a rear surface of the door 102 is in close contact with a front surface of the cabinet 101 (that is, the circumference of the opening), and thus, airtightness of the treatment chamber 110 can be maintained. In some embodiments, a sealer for sealing the treatment chamber 110 may be interposed between the door 102 and the cabinet 101.

A hanger bar 112 may be provided within the treatment chamber 110. A hanger (not illustrated) on which clothes are hung may be hung on the hanger bar 112. The hanger bar 112 may be configured to be reciprocally movable from side to side. A motor-operated driving device (not illustrated) for automatically and reciprocally moving the hanger bar 112 from side to side according to a pre-programmed drive algorithm may be further provided. The motor-operated driving device may include an electric motor (not illustrated) and a power transmission unit (not illustrated) for converting driving power of the motor and reciprocally moving the hanger bar 112. Herein, the power transmission unit may be configured in various ways, including, for example, a crank, a rack and pinion, and a cam.

The treatment chamber 110 may be defined as a space limited by inner side surfaces of the cabinet 101. An air inlet port 113, an air discharge port 114, and a steam discharge port 115 may be formed in the inner side surfaces of the cabinet 101. In an embodiment, the inner side surfaces of the cabinet 101 may include an upper surface 111U, a bottom surface 111B, a left surface 111L, a right surface 111R, and a rear surface 111RE. The bottom surface 111B may include a horizontal surface 111H horizontally extending backwards from the inlet of the treatment chamber 110, and an inclined surface 111I upwardly inclined backwards from the horizontal surface 111H and connected to the rear surface 111RE. However, the inner side surfaces of the cabinet 101 may be configured differently depending on the embodiment.

A machine room 120 may be located on the lower side of the treatment chamber 110, and a heat pump 121, a ventilation fan 122, and a steam generator 123 may be disposed within the machine room 120. The heat pump 121 may dehumidify air introduced from the treatment chamber 110 through the air inlet port 113, and then discharge the air into the treatment chamber 110 through the air discharge port 114. However, the present disclosure is not limited thereto. The heat pump 121 may appropriately control a compressor, which will be described later, so as to supply hot and dry air to dry clothes housed in the treatment chamber 110.

A circulation flow path 124 may be configured to guide air introduced through the air inlet port 113 to the air discharge port 114. Air may be sent by the ventilation fan 122 and then discharged into the treatment chamber 110 through the air discharge port 114.

When the door 102 is closed, the treatment chamber 110 forms a space isolated from external air. Thus, air inside the treatment chamber 110 may be circulated along the circulation flow path 124. However, when the door 102 is open, external air is introduced into the treatment chamber 110, and then introduced into the air inlet port 113 and transported along the circulation flow path 124 and discharged through the air discharge port 114. Some of the discharged air may be released to the outside through the open front surface of the treatment chamber 110.

The heat pump 121 may absorb heat from air introduced into the circulation flow path 124 through the air inlet port 113 from the treatment chamber 110 while a refrigerant is circulated, and the heat pump may use the absorbed heat to heat air to be discharged through the air discharge port 114. The heat pump 121 may include an evaporator 126, a compressor 127, an expansion valve 128, and a condenser 129 connected to each other through a refrigerant pipe 125 along which a refrigerant serving as working fluid is circulated.

The evaporator 126 may include a heat exchanger including micro-diameter tubes connected to the refrigerant pipe 125, and thermal conductive heat transmission plates transmitting heat to the tubes. The evaporator 126 may be provided on the circulation flow path 124, and may absorb heat from the circulating air. The evaporator 126 may absorb heat from air discharged from the treatment chamber 110 (that is, air introduced into the circulation flow path 124 through the air inlet port 113) and transmit the absorbed heat to the refrigerant in the tubes to evaporate the refrigerant.

In this case, moisture in the air may be condensed while passing through the evaporator 126. A condensate water discharge pump 130 for discharging condensate water from the circulation flow path 124 may be provided. The condensate water discharged through the condensate water discharge pump 130 may be collected in a drain water tank 116.

The compressor 127 may compress the refrigerant passing through the evaporator 126. The compressor 127 may be an inverter compressor of which the number of revolutions (or compression capacity) may be changed, but is not limited thereto. The compression capacity of the inverter compressor may be varied by controlling the number of revolutions, such that a heating value of the condenser 129 may be controlled. The inverter compressor uses DC power as a power source. To this end, a driver (not illustrated), which converts AC power into DC power for conversion to a target frequency, may be further provided.

The condenser 129 may have substantially the same configuration as the evaporator 126, but unlike the evaporator 126 may serve to condense the refrigerant. That is, the refrigerant compressed by the compressor 127 may be condensed while passing through the condenser 129, and heat may be released to its vicinity during this process. The condenser 129 may be disposed downstream from the evaporator 126 on the circulation flow path 124. The air of which humidity is lowered while passing through the evaporator 126 may be then heated while passing through the condenser 129. The condenser 129 may serve as a heater to heat the circulated air. A refrigerant circulation circuit may be formed in such a manner that after heat of the refrigerant is taken away by the circulating air while the refrigerant passes through the condenser 129, the refrigerant is expanded while passing through the expansion valve 128, and is introduced again into the evaporator 126.

The drain water tank 116 may be detachably provided in the cabinet 101 so as to facilitate the disposal of condensate water. The user can separate the drain water tank 116 from the cabinet 101 and dispose of condensate water collected therein. A water supply tank 117 may be filled with water required to generate steam. The water in the water supply tank 117 may be supplied to the steam generator 123 and used to generate steam. The water supply tank 117 may be detachably provided in the cabinet 101 so as to facilitate the addition of water. The user may separate the water supply tank 117 and fill water therein.

A door sensor 131 that senses whether the door 102 is open may be further provided. A controller 190 may determine whether the door 102 is open based on an output value of the door sensor 131. The door sensor 131 may include a lead switch provided in any one of the cabinet 101 or the door 102 and a magnet provided in the other one of the cabinet 101 or the door 102. The intensity of magnetic force applied to the lead switch from the magnet may vary depending on the position of the door 102, and thus a circuit connected to the lead switch may be open or short. For example, when the door 102 is closed, a distance between the magnet and the lead switch is short. Therefore, the lead switch is contacted by means magnetic force. Thus, a signal may be applied to the controller (190 in FIG. 4) through the circuit connected to the lead switch, and the controller 190 may determine that the door 102 is closed. On the contrary, when the door 102 is open, the signal applied to the controller 190 is blocked. Therefore, the controller 190 may determine that the door 102 is open.

However, the present disclosure is not limited thereto. The door sensor 131 can be implemented in various ways. For example, a latch (not illustrated) may be provided in the door 102, and a door lock (not illustrated) configured to engage the latch and lock the door 102 when the door 102 is closed may be provided in the cabinet 101. Further, a switch (not illustrated) to be contacted by the latch may be provided in the door lock. In this case, the switch may serve as the door sensor 131 that senses whether the door 102 is open.

Figure 4:
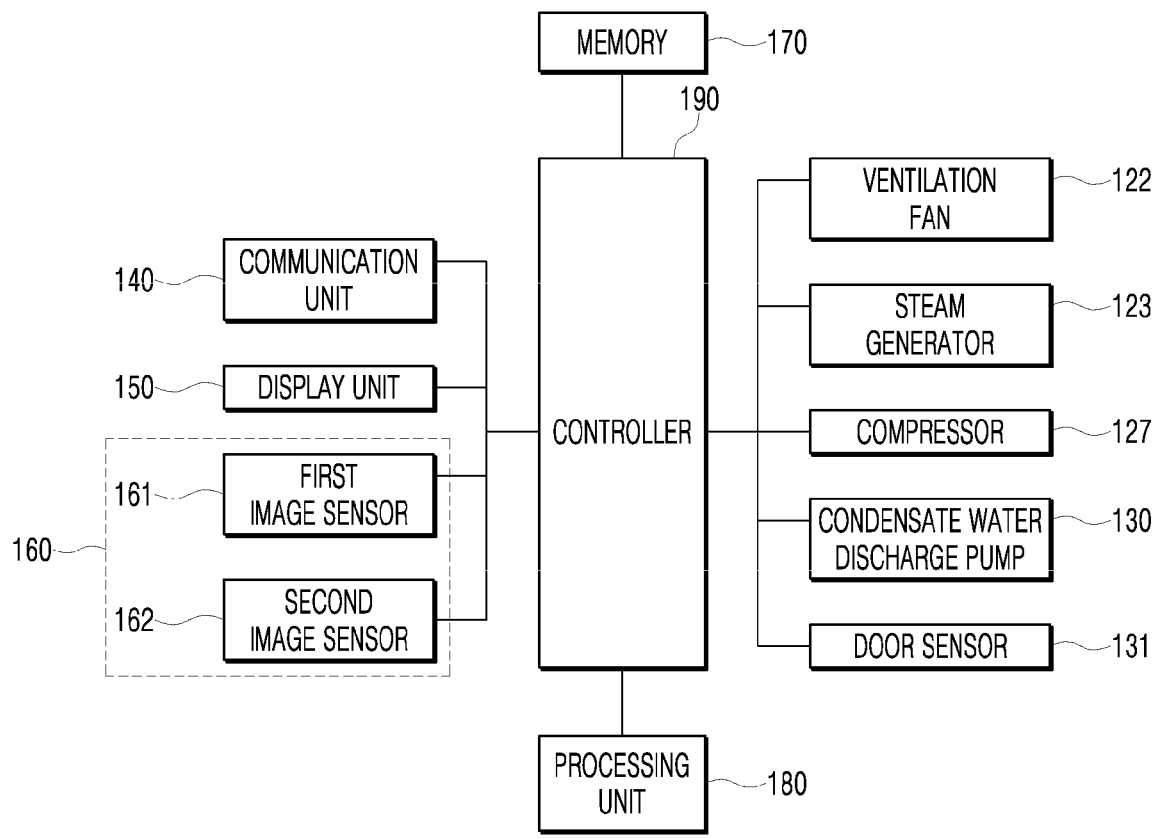
FIG. 4 is a schematic block diagram illustrating a clothes treating apparatus according to an embodiment of the present disclosure.

FIG. 4 is a schematic block diagram illustrating a clothes treating apparatus according to an embodiment of the present disclosure. Hereinafter, detailed descriptions of parts illustrated in FIG. 4 which overlap with those of FIG. 1 through FIG. 3 will be omitted. Referring to FIG. 4, the clothes treating apparatus 100 may include a communication unit 140, a display unit 150, an image sensor 160, a memory 170, a processing unit 180, and the controller 190.

The communication unit 140 may provide a communication interface required to provide signals between the clothes treating apparatus 100, the user device 200, and/or the server 300 in the form of packet data by interworking with the network 400. Further, the communication unit 140 may support various object intelligence communications (for example, Internet of Things (IoT), Internet of Everything (IoE), and Internet of Small Things (IoST)), and may support communication such as machine to machine (M2M) communication, vehicle to everything (V2X) communication, and device to device (D2D) communication.

Figure 5:
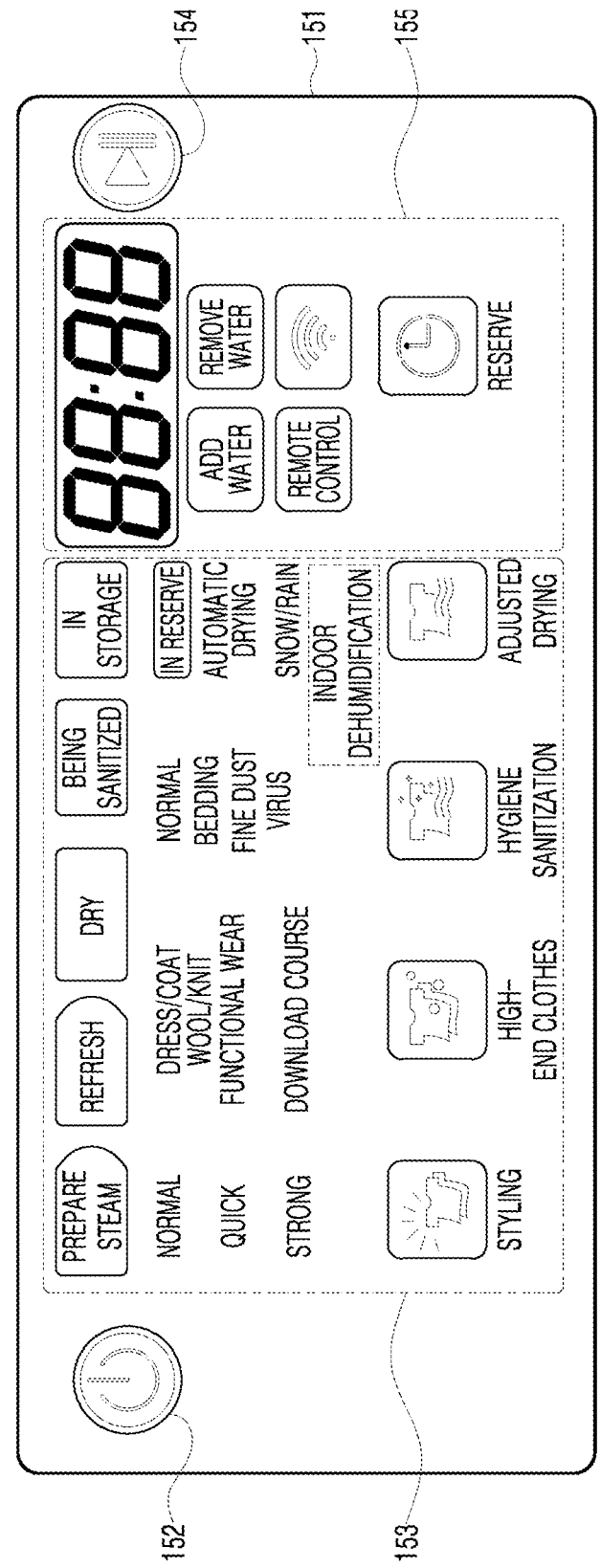
FIG. 5 is a diagram illustrating an example of an operation mode control panel displayed on a display unit of the clothes treating apparatus of FIG. 4.

The display unit 150 may display an operation status of the clothes treating apparatus 100 under the control of the controller 190. In the present embodiment, the display unit 150 may display the result of setting an operation mode of the clothes treating apparatus 100 according to the result of analyzing the clothing image. FIG. 5 illustrates an example of an operation mode control panel 151 displayed on the display unit 150. Referring to FIG. 5, the operation mode control panel 151 may include a power setting unit 152 configured to set the power to be on or off, a course setting unit 153 configured to select various courses, a start/stop selection unit 154 configured to select starting or stopping of an operation according to the selected course, and a status display unit 155 configured to display an operation status of the clothes treating apparatus 100. In the present embodiment, the operation mode control panel 151 may be automatically set and operated according to the result of analyzing the clothing image.

Further, the display unit 150 may be configured as a mirror display such that the entire door 102 can serve as a mirror. If the display unit 150 is placed on the door 102 in the form of a mirror display, the user can look at and check the clothes he or she is wearing in the mirror display.

Further, the display unit 150 may display the result of setting an operation mode of a washing machine 500 and/or a clothes dryer 600 interworking with the clothes treating apparatus 100. In a selective embodiment, the display unit 150 may display the result of recommending user-customized clothes based on the result of analyzing the facial and body type images of the user, and may also display weather information when recommending the user-customized clothes. Further, the display unit 150 may display information about shopping malls, and in response to a selection of the user may access a shopping mall and display a series of pieces of information so as to enable the user to shop.

In the present embodiment, the display unit 150 may serve as an input unit that receives a predetermined control instruction to control all operations of the clothes treating apparatus 100, as well as displaying various information. To this end, the display unit 150 may be equipped with a touch sensing display controller or various input/output controllers. For example, the touch sensing display controller may provide an output interface and an input interface between the apparatus and the user. The touch sensing display controller may exchange electrical signals with the controller 190. Further, the touch sensing display controller may display visual output to the user, and the visual output may include text, graphics, images, video, and a combination thereof. The display unit 150 may be a predetermined display member such as an organic light emitting display (OLED), a liquid crystal display (LCD), or a light emitting display (LED) capable of sensing a touch.

In a selective embodiment, the display unit 150 may further include an audio output unit (not illustrated) that outputs all of the displayed information in the form of audio signals. Under the control of the controller 190, the audio output unit may output, in the form of audio signals, alert messages such as an alarm, an operation mode, an operation status, and an error status, information corresponding to a voice command of the user, and the result of treatment corresponding to a voice command of the user. The audio output unit may convert electrical signals from the controller 190 into audio signals and output the audio signals. To this end, the audio output unit may include a speaker (not illustrated), or the like. In the present embodiment, the clothes treating apparatus 100 may further include an audio input unit (not illustrated). Under the control of the controller 190, the audio input unit (for example, a microphone) may receive input the user's voice spoken toward the clothes treating apparatus 100. Further, the audio input unit may include a plurality of microphones to more accurately receive the user's voice. The plurality of microphones may be located at different positions at a distance from each other, and may process the received voice of the user into electrical signals.

The image sensor 160 may be configured as a camera (not illustrated) including a first image sensor 161 and a second image sensor 162, and may be configured photograph the outside and the inside of the clothes treating apparatus 100. To improve the imaging efficiency, three or more image sensors 160 may be provided. The image sensor 160 may be a camera that photographs a subject in a field of view using, for example, a complementary metal-oxide semiconductor (COMS) module (not illustrated) or a charge coupled device (CCD) module (not illustrated). The input image frame may be provided to the COMS module or the CCD module through a lens (not illustrated), and the COMS module or the CCD module may convert optical signals of the subject passing through the lens into electrical signals and output the electrical signals. Further, the camera may be a PTZ camera provided with panning, tilting, and zoom functions. An image signal processor (not illustrated) may be provided inside the camera, and may reduce noise of the captured image frame and perform image signal processing for improving image quality, such as gamma correction, color filter array interpolation, color matrix, color correction, and color enhancement. Further, the image signal processor may perform functions such as coloring, blurring, edge emphasis, image interpreting, image recognition, and image effects. The image recognition may include, for example, face recognition and scene recognition. For example, the image signal processor may perform luminance level control, color correction, contrast control, edge emphasis control, screen split, character image generation, and synthesis of images.

In the present embodiment, the first image sensor 161 may be provided on an upper part of a front surface of the door 102 together with the display unit 150, and may photograph the outside of the clothes treating apparatus 100. For example, the first image sensor 161 may photograph the user holding clothes to be put into the clothes treating apparatus 100, and may photograph facial and body type information of the user. Further, the first image sensor 161 may photograph the user wearing clothes whenever the user looks at the clothes he or she is wearing in the mirror display (for example, before going to work, before going out, or whenever the user wishes to). This is because the entire front surface of the door 102 including the display unit 150 is formed of a mirror-like material. Also, the first image sensor 161 may take a photo in response to an imaging control signal from the controller 190 which has received the user's speech (for example, "Take a photo"), or in response to an imaging control signal from the controller 190 which has detected that the user has been standing in front of the clothes treating apparatus 100 for a predetermined period of time (for example, 2 seconds) or more. Meanwhile, the photograph taken by the first image sensor 161 may be stored in the memory 170.

The second image sensor 162 may be provided on an upper part of the inner left surface 111L of the cabinet 101, and may photograph the inside of the clothes treating apparatus 100. The second image sensor 162 may be provided at any position as long as it can photograph the inside of the clothes treating apparatus 100. In the present embodiment, the first image sensor 161 may be provided on the upper part of the front surface of the door 102 together with the display unit 150, and may photograph the outside of the clothes treating apparatus 100. For example, the second image sensor 162 may photograph clothes put into the clothes treating apparatus 100 before and after treatment. Meanwhile, the photographs taken by the second image sensor 162 may be stored in the memory 170.

In a selective embodiment, the clothes treating apparatus 100 may include various sensors (not illustrated). These sensors may sense at least one among information about the inside of the clothes treating apparatus 100, information about the environment surrounding the clothes treating apparatus 100, and information about the user. For example, the sensors may include at least one among an obstacle sensor (for example, a proximity sensor, and a Lidar sensor), a weight sensor, an illumination sensor, a touch sensor, an acceleration sensor, a magnetic sensor, a gravity sensor (G-sensor), a gyroscope sensor, a motion sensor, an RGB sensor, an infrared (IR) sensor, a finger scan sensor, an ultrasonic sensor, an optical sensor, a battery gauge, an environment sensor (for example, a barometer, a hygrometer, a thermometer, a radiation detection sensor, a thermal sensor, and a gas sensor), and a chemical sensor (for example, an electronic nose, a health care sensor, and a biometric sensor). Meanwhile, in the present embodiment, the clothes treating apparatus 100 may use a combination of information sensed by at least two of these sensors.

The memory 170 may store information for supporting various functions of the clothes treating apparatus 100. The memory 170 may store a plurality of application programs (or applications) driven in the clothes treating apparatus 100, and information and commands for operations of the clothes treating apparatus 100. At least some of the application programs may be downloaded from an external server through wireless communication. Further, the memory 170 may store information about at least one user intending to interact with the clothes treating apparatus 100. The user information may include facial type information and body type information (photographed by the first image sensor 161) to be used for identifying a recognized user. Further, the memory 170 may store clothing images photographed by the first image sensor 161 and the second image sensor 162. Furthermore, the memory 170 may store instructions (control codes) for controlling the washing machine 500 and the clothes dryer 600 interworking with the clothes treating apparatus 100.

Further, the memory 170 may store various reference values used for analyzing a clothing image. The memory 170 may store first reference values digitalized from various kinds of image information (such as appearance and design) for respective types of clothes, which can be used for analyzing a type of clothes such as a T-shirt, a blouse, a button-down shirt, a dress shirt, long pants, short pants, a dress, a swimsuit, and the like. The memory 170 may store second reference values digitalized from various image information (for example, image information about the shape of thread of each material) and component information for respective clothes materials, which can be used for analyzing a clothes material such as wool, cotton, polyester, hemp cloth, cashmere, and the like. Further, the memory 170 may store third reference values digitalized from image information and component information for respective contaminants which can be used for analyzing a type of a contaminant such as coffee, kimchi liquid, dust, and the like, and the degree of contamination of clothes.

In the present embodiment, the memory 170 may serve to temporarily or permanently store data processed by the controller 190. Herein, the memory 170 may include magnetic storage media or flash storage media, but the scope of the present disclosure is not limited thereto. The memory 170 may include an internal memory and/or an external memory and may include a volatile memory such as DRAM, SRAM or SDRAM and a non-volatile memory such as one time programmable ROM (OTPROM), PROM, EPROM, EEPROM, mask ROM, flash ROM, NAND flash memory or NOR flash memory, a flash drive such as an SSD, a compact flash (CF) card, an SD card, a Micro-SD card, a Mini-SD card, an XD card or memory stick, or a storage device such as a HDD.

The processing unit 180 may acquire a clothing image by photographing the user wearing clothes and standing in front of the mirror display placed on the door 102, analyze the clothing image, automatically set an operation mode of the clothes treating apparatus according to the result of analyzing the clothing image, and cause the clothes treating apparatus to operate according to the set operation mode. Further, the processing unit 180 may automatically set a wash mode of the washing machine (500 in FIG. 8) which interworks with the clothes treating apparatus 100 according to the result of analyzing the clothing image. Furthermore, the processing unit 180 may automatically set a dry mode of the clothes dryer (600 in FIG. 8) which interworks with the clothes treating apparatus 100 and the washing machine 500. Besides, the processing unit 180 may acquire and analyze facial and body type images of the user, and recommend user-customized clothes based on the result of analyzing the facial and body type images of the user.

In the present embodiment, the processing unit 180 may be provided outside the controller 190 as shown in FIG. 4, or may be provided inside the controller 190 and may operate like the controller 190. Otherwise, the processing unit 180 may be provided inside the server 300 illustrated in FIG. 1. Detailed operations of the processing unit 180 will be described below with reference to FIG. 6.

The controller 190 is a kind of central processing unit, and may control all operations of the clothes treating apparatus 100 by executing control software loaded in the memory 170. In the present embodiment, the controller 190 may acquire and analyze a clothing image, automatically set an operation mode of the clothes treating apparatus according to the result of analyzing the clothing image, and cause the clothes treating apparatus to operate according to the set operation mode. The controller 190 may control at least one of the ventilation fan 122, the steam generator 123, the compressor 127, the condensate water discharge pump 130, and the door sensor 131 according to the set operation mode.

Further, the controller 190 may automatically set an operation mode of the washing machine 500 and/or the clothes dryer 600 interworking with the clothes treating apparatus 100 according to the result of analyzing the clothing image, and cause the washing machine 500 and/or the clothes dryer 600 to operate according to the set operation mode. Furthermore, the controller 190 may acquire and analyze facial and body type images of the user, and recommend user-customized clothes based on the result of analyzing the facial and body type images of the user. In addition, the controller 190 may recommend user-customized clothes based on the result of analyzing the facial and body type images of the user and weather information.

The controller 190 may further include a voice recognition unit (not illustrated) in order for the user to control an operation of the clothes treating apparatus 100 by voice command. To this end, the memory 170 may store a voice recognition algorithm and a wakeup word that can drive the clothes treating apparatus 100. Thus, when the user utters the wakeup word, the controller 190 may operate the voice recognition unit, and the voice recognition unit may recognize the wakeup word and then switch the clothes treating apparatus 100 from an inactive state to an active state. After the clothes treating apparatus 100 is switched to the active state, the controller 190 may recognize a voice command of the user through the audio input unit, and control an operation of the clothes treating apparatus 100 in response to the voice command. In the present embodiment, the voice recognition unit may be provided inside the processing unit 180 or may be provided independently outside the controller 190.

Herein, the controller 190 may include all kinds of devices capable of processing data, such as a processor. Herein, the term "processor" may refer to, for example, a data processing device which is embedded in hardware and has a physically structured circuit for performing functions expressed as codes or commands included in a program. Examples of the data processing device embedded in hardware may include a microprocessor, a central processing unit (CPU), a processor core, a multiprocessor, an application-specific integrated circuit (ASIC), and a field programmable gate array (FPGA), but the scope of the present disclosure is not limited thereto.

In the present embodiment, the controller 190 may apply machine learning such as deep learning to the analyzing the clothing image (a type of clothes, a material of clothes, and the degree of contamination of clothes), the setting of an operation mode, and the recommendation of user-customized clothes. The memory 170 may store data such as data used for machine learning and result data.

Deep learning is a kind of machine learning, and may allow a device or apparatus to perform learning in multiple, progressively deeper stages based on data. The deep learning may represent a set of machine learning algorithms that extract important data from a plurality of data sets at a higher layer.

A deep learning structure may include an artificial neural network (ANN). For example, the deep learning structure may include a deep neural network (DNN), such as a convolutional neural network (CNN), a recurrent neural network (RNN), and a deep belief network (DBN). In the present embodiment, the deep learning structure may use a variety of structures well known to those skilled in the art. For example, the deep learning structure according to the present disclosure may include a CNN, a RNN, and a DBN. The RNN has been widely used in natural language processing, and can be effectively used to process time-series data that changes over time, and may construct an ANN structure by progressively extracting higher level features through multiple layers. The DBN may include a deep learning structure that is constructed by stacking the result of restricted Boltzman machine (RBM) learning in multiple layers. When a predetermined number of layers are constructed by repetition of such RBM learning, the DBN provided with the predetermined number of layers can be constructed. The CNN may include a specific model that imitates human brain functions. The specific model assumes that basic characteristics of a target object are extracted when the person recognizes the target object, and the extracted result is then processed by a complex calculation such that the target object can be recognized.

Further, training of an ANN may be performed by adjusting a weight value of a connection line between nodes (and a bias value if necessary) so that a desired output is outputted in response to a given input. Further, the ANN may constantly update the weight value by training. Furthermore, back propagation or the like may be used to train the ANN.

The controller 190 may include an ANN, for example, a deep neural network (DNN) such as a CNN, an RNN, or a DBN, and may train the DNN to analyze a clothing image, set an operation mode, and recommend user-customized clothes. As a machine learning scheme for the ANN, both unsupervised learning and supervised learning may be used. The controller 190 may perform control to update the architecture of the trained ANN depending on settings.

Figure 6:
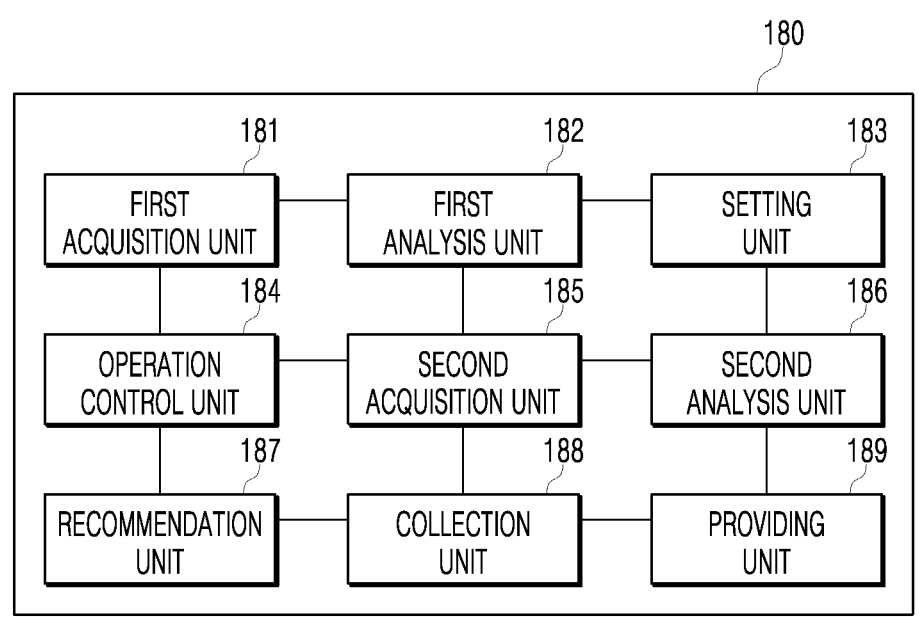
FIG. 6 is a schematic block diagram illustrating a processing unit of the clothes treating apparatus of FIG. 4.

FIG. 6 is a schematic block diagram illustrating a processing unit of the clothes treating apparatus of FIG. 4. Hereinafter, detailed descriptions of parts illustrated in FIG. 6 which overlap with those of FIG. 1 through FIG. 5 will be omitted. Referring to FIG. 6, the processing unit 180 may include a first acquisition unit 181, a first analysis unit 182, a setting unit 183, an operation control unit 184, a second acquisition unit 185, a second analysis unit 186, a recommendation unit 187, a collection unit 188, and a providing unit 189. In some implementations, the processing unit 180 may include one or more processors. In some implementations, the units 181-189 may correspond to the one or more processors. In some implementations, the units 181-189 may correspond to software components configured to be executed by the one or more processors.

Figure 7:
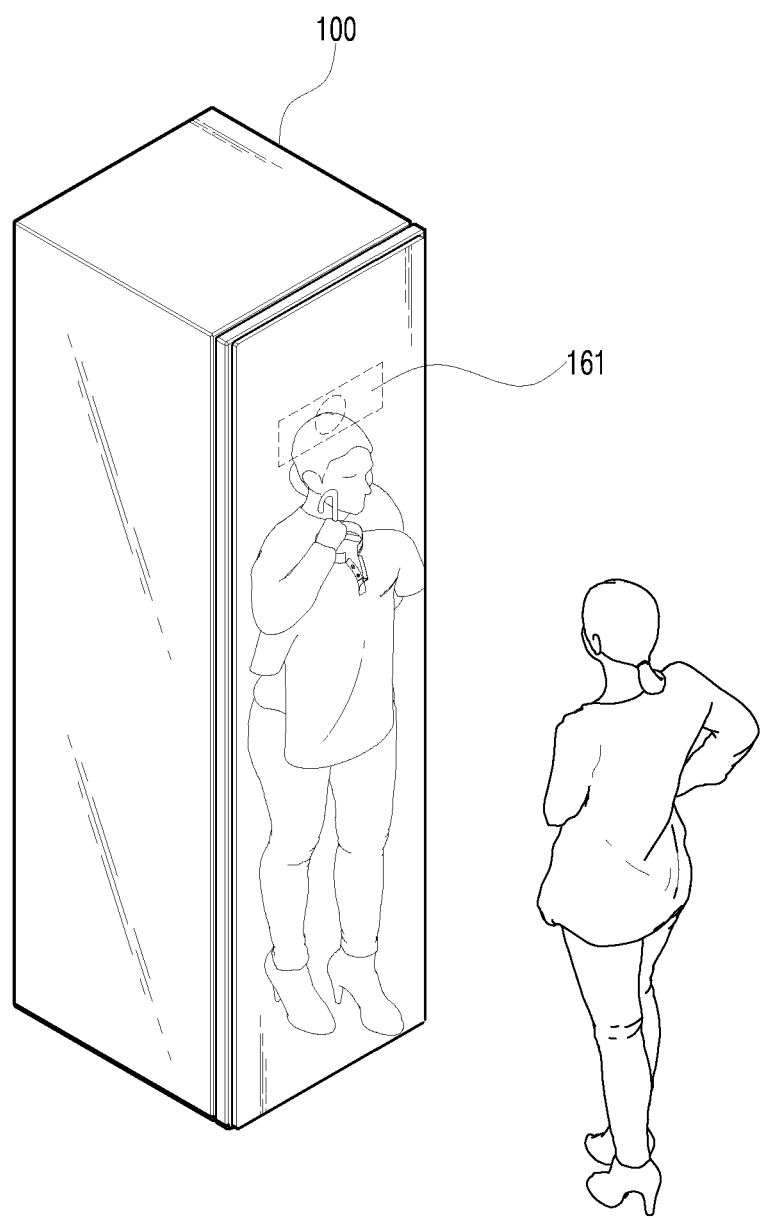
FIGS. 7 to 9 are diagrams illustrating an example of an operation of a clothes treating apparatus.

The first acquisition unit 181 may acquire a clothing image from the first image sensor 161 that photographs the user wearing clothes and standing in front of the mirror display placed on the door 102. Herein, the clothing image may include a clothing image of the user holding the clothes (hereinafter referred to as "clothing image 1-1"), photographed by the first image sensor 161, or a clothing image of the user wearing the clothes hereinafter referred to as "clothing image 1-2", photographed by the first image sensor 161. FIG. 7 illustrates an example in which the user is holding clothes on a hanger in front of a front surface of the clothes treating apparatus 100 in order to put the clothes into the clothes treating apparatus 100 (that is, as a treatment target for the clothes treating apparatus 100), and the first image sensor 161 photographs the user holding the clothes to generate the clothing image 1-1. In the present embodiment, the clothing image 1-2 may also be a processing target for the clothes treating apparatus 100. The clothing image may include a clothing image of clothes hung on the hanger bar 112 before treatment (hereinafter referred to as "clothing image 2-1"), photographed by the second image sensor 162, and a clothing image of clothes hung on the hanger bar 112 after treatment (hereinafter referred to as "clothing image 2-2"), taken by the second image sensor 162.

The first acquisition unit 181 may serve to determine whether the user in front of the mirror display is facing the clothes treating apparatus 100, and acquire a clothing image photographed by the first image sensor 161 when the user in front of the mirror display is detected to have been facing the clothes treating apparatus 100 for a predetermined period of time or more. The operation of determining whether the user is facing the clothes treating apparatus 100 may be performed based on the user's face.

The first analysis unit 182 may analyze the clothing image acquired by the first acquisition unit 181. The first analysis unit 182 may extract a human being (that is, the user) from the clothing image 1-1 and the clothing image 1-2 by using previously stored body type information of the user, and extract the clothes as an object by using a well-known object recognition method.

Further, by means of image comparison, the first analysis unit 182 may analyze whether the clothing image 2-1 is identical to the clothing image 1-1, and whether the clothing image 2-2 is cleaner than the clothing image 2-1. Herein, the clothing image 2-1 and the clothing image 2-2 can be distinguished from each other due to a difference in imaging time. Herein, when the clothing image 2-1 is identical to the clothing image 1-1 according to the result of analysis by the first analysis unit 182, this result may be used as a control signal to start an operation of the clothes treating apparatus 100 by the operation control unit 184 thereafter. That is, when the clothing image 1-1 acquired first is identical to the clothing image 2-1 acquired after a predetermined period of time (for example, 5 seconds) elapses, the first analysis unit 182 may transmit the result of analysis to the operation control unit 184 after a predetermined period of time (for example, 10 seconds) elapses, and the operation control unit 184 may start an operation of the clothes treating apparatus 100.

In the present embodiment, the first analysis unit 182 may analyze at least one among a type of the clothes (object) recognized from the first clothing image, a material of the clothes, and the degree of contamination of the clothes. The first analysis unit 182 may compare a value digitalized from the clothes as an object recognized from the first clothing image with the first reference values to analyze a type of the clothes such as a T-shirt, a blouse, a button-down shirt, a dress shirt, long pants, short pants, a dress, swimsuit, and the like. This analysis is needed because different types of clothes require different operation modes (courses). In a selective embodiment, the first analysis unit 182 may determine a type of clothes by using a deep neural network model which has been previously trained to identify the clothes from a clothing image and determine a type of the clothes.

Further, the first analysis unit 182 may compare, with the second reference values, a value digitalized from the shape of thread obtained by imaging the clothes recognized from the first clothing image at high magnification, in order to analyze a material of the clothes such as wool, cotton, polyester, hemp cloth, cashmere, and the like, and may search for component information of each material stored in the memory 170. This analysis is needed because different materials and components of clothes require different operation modes (courses). In a selective embodiment, the first analysis unit 182 may determine a material of clothes by using a deep neural network model which has been previously trained to identify the clothes from a clothing image and determine a material of the clothes.

Furthermore, the first analysis unit 182 may compare, with the third reference values, a value digitalized from a portion with a different color or pattern in a magnified clothing image obtained by imaging the clothes recognized from the first clothing image at high magnification, in order to analyze a type of a contaminant such as coffee, kimchi liquid, dust, and the like, and the degree of contamination of the clothes, and may search for component information of each contaminant stored in the memory 170. This analysis is needed because different types of contaminants and different degrees of contamination of clothes require different operation modes (courses). In a selective embodiment, the first analysis unit 182 may determine the degree of contamination of the clothes by using a deep neural network model which has been previously trained to identify the clothes from a clothing image and determine the degree of contamination of the clothes.

The setting unit 183 may set an operation mode of the clothes treating apparatus 100 according to the result of analyzing the clothing image obtained by the first analysis unit 182. According to conventional methods, the user is required to manually set an operation mode on the operation mode control panel 151 displayed on the display unit 150. However, in the present embodiment, the setting unit 183 may automatically set an operation mode on the operation mode control panel 151 according to the result of analyzing the clothing image, which may give the user convenience.

The setting unit 183 may automatically set an operation mode to be performed based on at least one among the results of analyzing a type of the clothes, a material of the clothes, and the degree of contamination of the clothes in the first clothing image obtained by the first analysis unit 182. For example, when the clothes in the first clothing image are analyzed as a polyester dress shirt contaminated with dust, the setting unit 183 may set an operation mode including strong steam, fine dust removal, and automatic drying.

Figure 8:
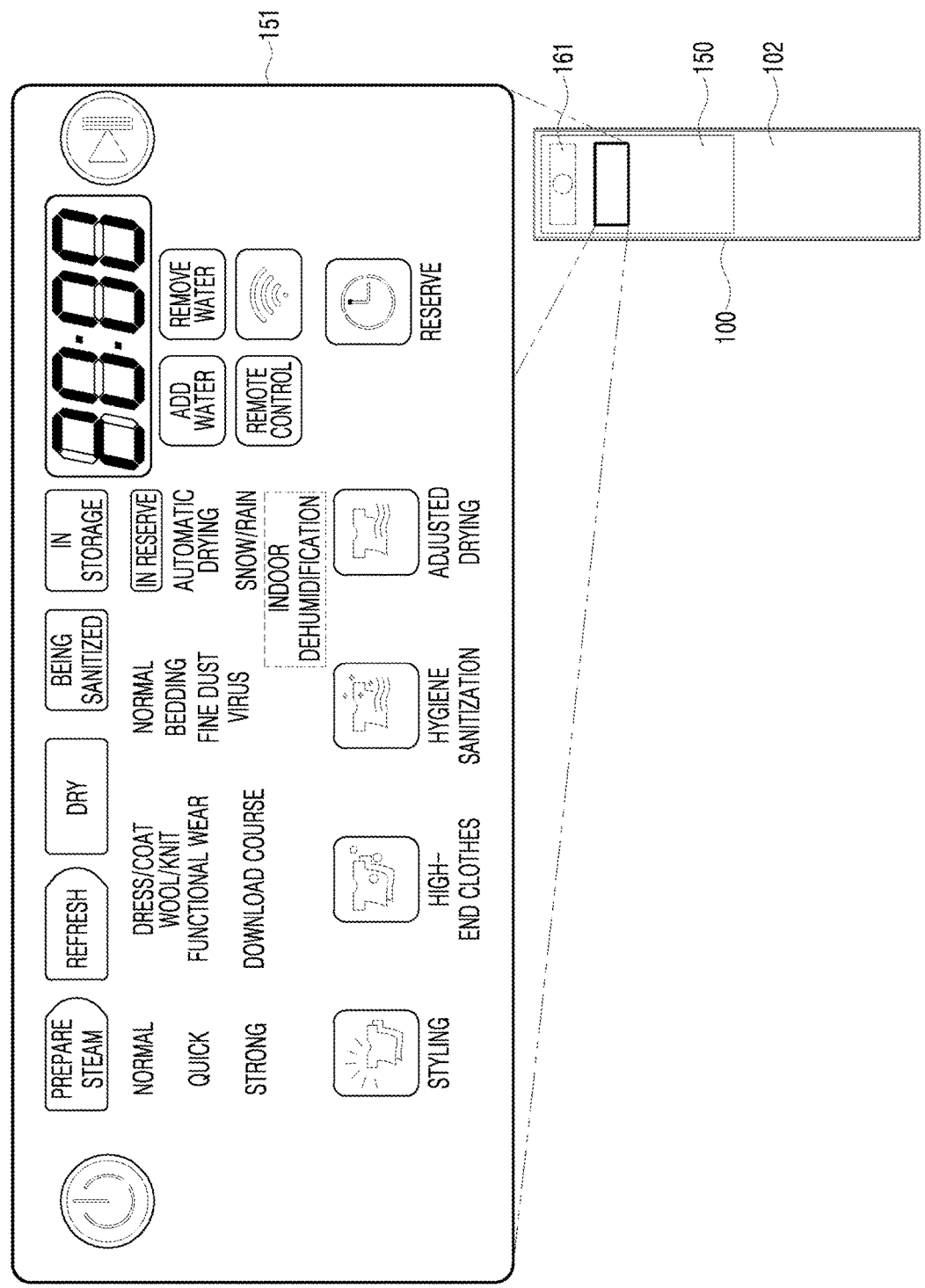

The operation control unit 184 may cause the clothes treating apparatus 100 to operate the clothes treating apparatus 100 according to the operation mode set by the setting unit 183. For example, if the setting unit 183 sets the operation mode including strong steam, fine dust removal, and automatic drying, the operation control unit 184 may cause the steam generator 123 to generate steam for a predetermined period of time according to the strong steam and fine dust removal operation modes, and cause the hanger bar 112 to reciprocally move from side to side a predetermined number of times for a predetermined period of time, and also cause the ventilation fan 122 to operate for a predetermined period of time. Herein, the operation control unit 184 may start an operation of the clothes treating apparatus 100 when a predetermined period of time (for example, 10 seconds) elapses after the clothing image 2-1 is analyzed as being identical to the clothing image 1-1. FIG. 8 illustrates an example in which the operation mode including strong steam, fine dust removal, and automatic drying set by the setting unit 183 is displayed on the operation mode control panel 151 and the operation control unit 184 controls operations of the clothes treating apparatus 100 according to the set operation mode.

Accordingly, the user simply needs to make a brief stop (for an amount of time to generate a clothing image by means the first image sensor 161) in front of the front surface of the clothes treating apparatus 100 holding clothes on a hanger to be put into the clothes treating apparatus 100, and then put the hanger on which the clothes are hung into the clothes treating apparatus 100. Then, the clothes treating apparatus 100 automatically sets an operation mode and operates. Thus, the user can clean the clothes in an optimal operation mode even if the user does not know how to use the clothes treating apparatus 100. Herein, when the user stops for a moment in front of the clothes treating apparatus 100 holding clothes on a hanger to be put into the clothes treating apparatus 100, the controller 190 may detect the user, and cause the first image sensor 161 to take a photo and the display unit 150 to display an output (including audio signals) so as to be recognized by the user.

The second acquisition unit 185 may acquire facial and body type images of the user taken by the first image sensor 161. The second acquisition unit 185 may make a request to photograph the face of the user and the body of the user in response to a selected option, so as to recommend user-customized clothes displayed on the display unit 150. When the user is ready to be photographed, he or she may say that he or she is ready to be photographed as a voice command. When the controller 190 receives the voice command, the controller 190 may cause the first image sensor 161 to photograph the face of the user (in a front view and a side view) and the body of the user (in a front view and a side view), and the second acquisition unit 185 may acquire facial and body type images of the user photographed by the first image sensor 161.

The second analysis unit 186 may compare the facial and body type images of the user acquired by the second acquisition unit 185 with reference values so as to analyze the facial type and the body type of the user. Herein, the reference values may include facial type reference values such as an egg-shaped face reference value, a round face reference value, an angular face reference value, a longish face reference value, and an inverted triangle face reference value. Each of the facial type reference values may be the average for general users having a certain facial type, and may be stored in the memory 170. Further, the reference values may include body type reference values such as a rectangular body reference value, a barrel-shaped body reference value, a box-shaped body reference value, or a pear-shaped body reference value. Each of the body type reference values may be the average for general users having a certain body type, and may be stored in the memory 170. The second analysis unit 186 may compare the facial type image of the user acquired by the second acquisition unit 185 with the facial type reference values so as to analyze the facial type of the user. Further, the second analysis unit 186 may compare the body type image of the user with the body type reference values so as to analyze the body type of the user.

The recommendation unit 187 may receive the result of analyzing the facial and body type images of the user from the second analysis unit 186, and recommend user-customized clothes. When the recommendation unit 187 recommends the user-customized clothes, the recommendation unit 187 may recommend a combination of one or more clothing images stored in the memory 170. A first clothing image stored in the memory 170 may be a candidate for the user-customized clothes, or the user may register any clothes for recommendation of the user-customized clothes. As a method for registering the clothes, the first image sensor 161 may be used to photograph clothes held or worn by the user. As another method for registering the clothes, the user may search for clothes from a certain website, SNS website, blog, or the like, capture a photo of the clothes, and store the captured photo in the user device 200, and then transmit the captured photo to the clothes treating apparatus 100 through the network 400.

The recommendation unit 187 may learn the user's frequently worn clothes, and create the user's favorite clothes styles and recommend user-customized clothes by combining the clothing images stored in the memory 170 according to the user's favorite clothes styles. Further, the recommendation unit 187 may extract an image of clothes complementing the user's facial and body type from the memory 170, or collect the image of clothes from a certain website, SNS website, blog, or the like through the network 400 according to the facial type information and body type information of the user. Then, the recommendation unit 187 may recommend the clothes as user-customized clothes. The recommendation unit 187 may also recommend information about other fashion products (for example, shoes, bags, accessories, cosmetics, and the like), together with the user-customized clothes.

In a selective embodiment, the recommendation unit 187 may recommend clothes corresponding to a voice command of the user. For example, the controller 190 that receives the user's voice command to recommend upper body clothes to match the lower body clothes being fitted by the user may give an order to the recommendation unit 187, and the recommendation unit 187 may recommend upper body clothes to match the lower body clothes through the display unit 150. Further, the controller 190 that receives the user's voice command to recommend other fashion products to match clothes being fitted by the user may give an order to the recommendation unit 187, and the recommendation unit 187 may recommend other fashion products to match the clothes being fitted by the user through the display unit 150. Herein, the recommended clothes and/or the recommended fashion products displayed on the display unit 150 may include one or more of the user's clothes and/or fashion products stored in the memory 170, and may alternatively include one or more of clothes and/or fashion products captured by the user and stored in the memory 170, and may further alternatively include clothes and/or fashion products complementing the user's facial and body type as collected from a certain website, SNS website, blog, or the like through the network 400 according to the facial type information and body type information of the user.

Further, the recommendation unit 187 may receive the user's feedback (for example, "I like it", or "Buy") on the user-customized clothes displayed on the display unit 150, and the user's feedback may be used to train the controller 190. The feedback information may be stored as a fitting rate for the clothes stored in the memory 170, and thus clothes with a higher fitting rate may be used first when user-customized clothes are recommended. Furthermore, the user-customized clothes recommended by the recommendation unit 187 may be virtually fitted to the user at the request of the user, and then outputted via the display unit 150. The virtual fitting can be performed because the facial and body type information of the user has been previously set.

The collection unit 188 may collect weather information from a weather server that provides weather information. In an embodiment, the collection unit 188 may access the server 300 that stores weather information collected from the weather server, and collect weather information. Herein, the weather information may include, for example, information on past, current, and future weather (for example, cloudy, clear, rainy, and snowy weather), temperature (for example, lowest temperature, highest temperature, and average temperature), season information (for example, spring, summer, fall, and winter), a fine dust index, a UV index, a humidity index, and an aridity index.

Figure 9:
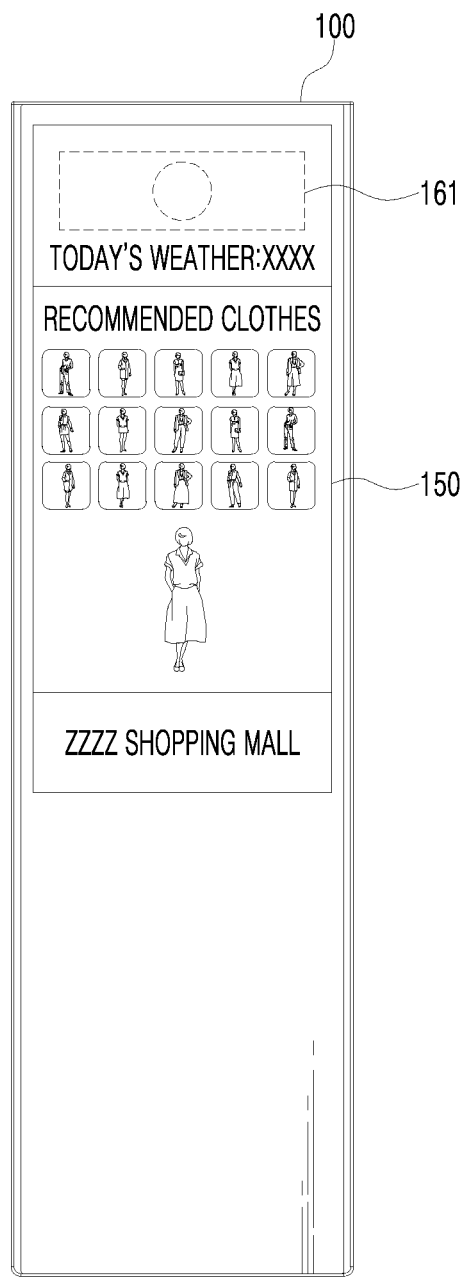

The recommendation unit 187 may recommend user-customized clothes based on the result of analyzing the facial and body type images of the user obtained by the second analysis unit 186 and the weather information collected by the collection unit 188. FIG. 9 illustrates user-customized clothes recommended by the recommendation unit 187 through the display unit 150. Herein, the display unit 150 may include first to third display areas. Today's weather information may be displayed in a first display area, a predetermined number of recommended clothes items and the most recommendable clothes for the weather may be displayed in a second display area, and information about a shopping mall where the user can buy the clothes may be displayed in a third display area.

The providing unit 189 may access the shopping mall in response to the choice of the user and provide information about the shopping mall on the display unit 150, and may also provide information about purchase and delivery of a product chosen by the user. Further, the providing unit 189 may provide, for example, health and beauty information, music, news, and traffic conditions in at least one of the first to third display areas. Further, the providing unit 189 may provide certain information to provide notification messages, play YouTube videos, or play the user's favorite music. Further, the providing unit 189 may provide today's weather information in response to the user's speech, for example, an utterance of "How is the weather today?".

Figure 10:
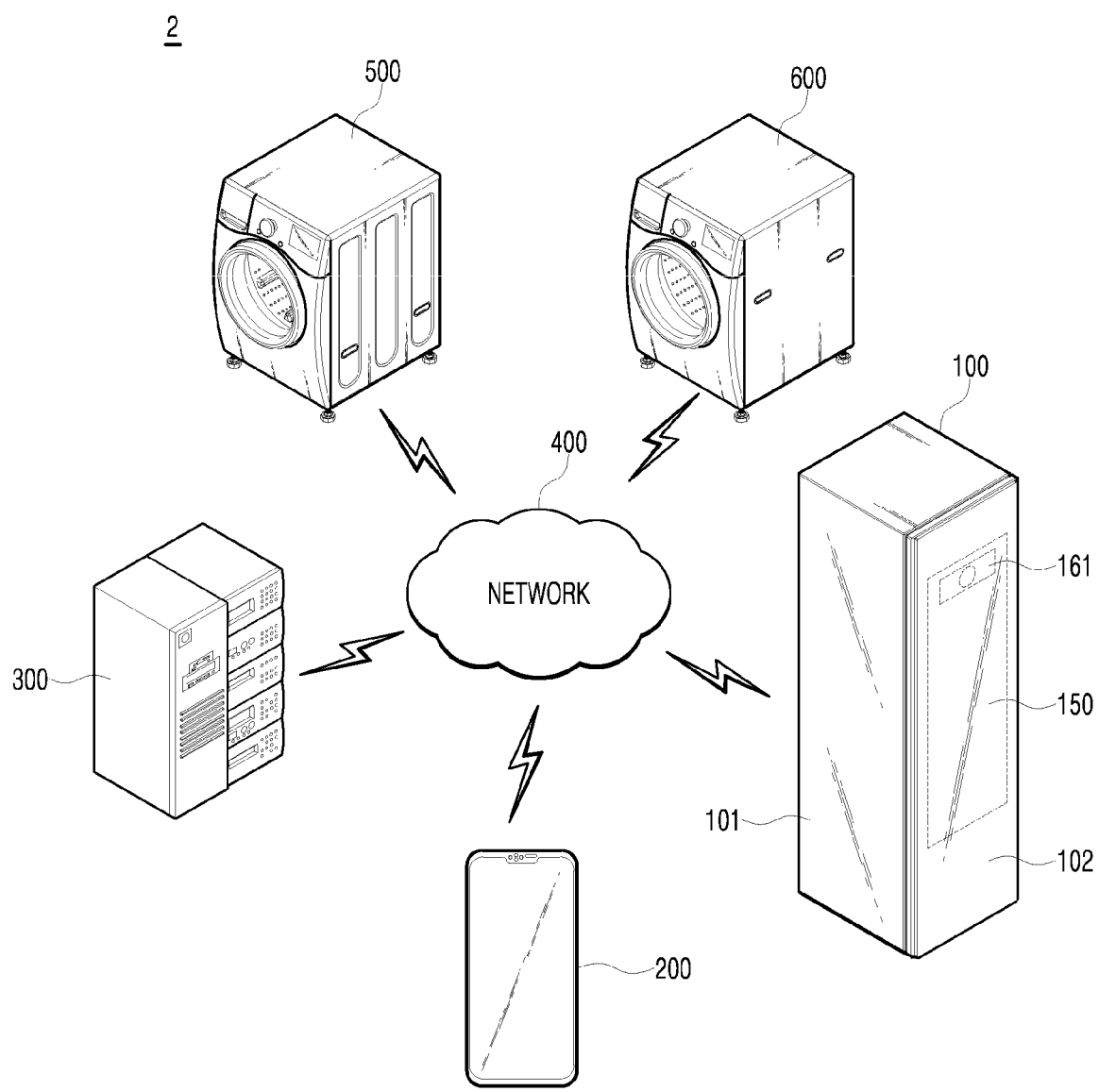
FIG. 10 is a diagram illustrating an example of a clothes treating environment including a clothes treating apparatus, a user device, a server, a washing machine, a clothes dryer, and a network connecting these to each other, according to another embodiment of the present disclosure.

FIG. 10 is a diagram illustrating an example of a clothes treating environment including a clothes treating apparatus, a user device, a server, a washing machine, a clothes dryer, and a network connecting these to each other, according to another embodiment of the present disclosure. Hereinafter, detailed descriptions of parts illustrated in FIG. 10 which overlap with those of FIGS. 1 to 9 will be omitted. Referring to FIG. 10, a clothes treating environment 2 may include the clothes treating apparatus 100, the user device 200, the server 300, the network 400, the washing machine 500, and the clothes dryer 600.

The clothes treating apparatus 100 may acquire and analyze a clothing image, automatically set an operation mode of the clothes treating apparatus 100 according to the result of analyzing the clothing image, and cause the clothes treating apparatus 100 to operate according to the set operation mode.

The clothes treating apparatus 100 may automatically set a wash mode of the washing machine 500 interworking with the clothes treating apparatus 100 according to the result of analyzing the clothing image, and cause the washing machine 500 to operate according to the set wash mode. Further, the clothes treating apparatus 100 may automatically set a dry mode of the clothes dryer 600 interworking with the clothes treating apparatus 100 and the washing machine 500, and cause the clothes dryer 600 to operate according to the set dry mode.

Herein, the interworking of the washing machine 500 and/or the clothes dryer 600 with the clothes treating apparatus 100 means that these components can communicate with each other through the same network 400, and the clothes treating apparatus 100 that stores control codes for the washing machine 500 and/or the clothes dryer 600 can control operations of the washing machine 500 and/or the clothes dryer 600.

When the clothes treating apparatus 100 treats clothes based on the result of analyzing the clothing image, if the clothes are not clean following the treatment, the clothes treating apparatus 100 may set a wash mode and/or a dry mode of the washing machine 500 and/or the clothes dryer 600, and advise the user to use the washing machine 500 and/or the clothes dryer 600. Since the clothes treating apparatus 100 automatically sets the wash mode and/or the dry mode of the washing machine 500 and/or the clothes dryer 600, the user simply needs to put the clothes into the washing machine 500 and/or the clothes dryer 600. Then, the washing machine 500 and/or the clothes dryer 600 may automatically wash and/or dry the clothes. Therefore, it is possible to improve the user's convenience.

When the user device 200 accesses a clothes treating apparatus drive application or a clothes treating apparatus drive website and goes through an authentication process, the user device 200 may receive a service for driving or controlling the clothes treating apparatus 100. In the present embodiment, the user device 200 which has completed the authentication process may drive the clothes treating apparatus 100 and control operations of the clothes treating apparatus 100, and also drive the washing machine 500 and/or the clothes dryer 600 interworking with the clothes treating apparatus 100 and control operations thereof.

The server 300 may receive and analyze the clothing image and automatically set a wash mode of the washing machine 500 interworking with the clothes treating apparatus 100 according to the result of analyzing the clothing image, and transmit, to the clothes treating apparatus 100 and/or the washing machine 500, a control signal to operate the washing machine 500 according to the set wash mode. Further, the server 300 may receive and analyze the clothing image and automatically set a dry mode of the clothes dryer 600 interworking with the clothes treating apparatus 100 and the washing machine 500 according to the result of analyzing the clothing image, and transmit, to the clothes treating apparatus 100 and/or the washing machine 500 and/or the clothes dryer 600, a control signal to operate the clothes dryer 600 according to the set dry mode.

Figure 11:
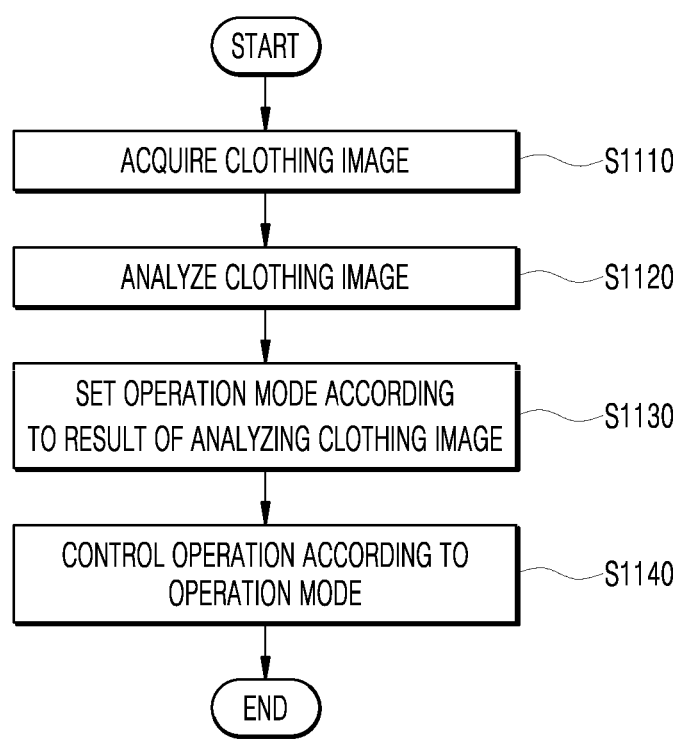
FIGS. 11 and 12 are flowcharts showing a method for operating a clothes treating apparatus according to an embodiment of the present disclosure.

FIG. 11 is a flowchart showing a method for operating a clothes treating apparatus according to an embodiment of the present disclosure. Hereinafter, detailed descriptions of parts illustrated in FIG. 11 which overlap with those of FIGS. 1 to 10 will be omitted.

Referring to FIG. 11, in step S1110, the clothes treating apparatus 100 acquires a clothing image. The clothes treating apparatus 100 may acquire a clothing image by using the first image sensor 161 to photograph the user wearing clothes and standing in front of the mirror display placed on the front surface (the door 102) of the clothes treating apparatus 100. The clothes treating apparatus 100 may acquire a clothes image 1-1 of the user holding clothes, photographed by the first image sensor 161 or a clothing image 1-2 of the user wearing the clothes, photographed by the first image sensor 161. Further, the clothes treating apparatus 100 may acquire a clothing image 2-1 of clothes hung on the hanger bar 112 before treatment, photographed by the second image sensor 162 and a clothing image 2-2 of the clothes hung on the hanger bar 112 after treatment, photographed by the second image sensor 162. The clothes treating apparatus 100 may determine whether the user in front of the mirror display is facing the clothes treating apparatus 100, and acquire a clothing image photographed by the first image sensor 161 when the user in front of the mirror display is detected to have been facing the clothes treating apparatus 100 for a predetermined period of time or more. In this case, the operation of determining whether the user is facing the clothes treating apparatus 100 may be performed based on the user's face.

In step S1120, the clothes treating apparatus 100 may analyze the acquired clothing image. The clothes treating apparatus 100 may extract a human being (that is, the user) from the clothing image 1-1 and the clothing image 1-2 by using previously stored body type information of the user, and extract the clothes as an object by a well-known object recognition method. The clothes treating apparatus 100 may analyze at least one among a type of the clothes (object) recognized from the first clothing image, a material of the clothes, and the degree of contamination of the clothes. The clothes treating apparatus 100 may compare a value digitalized from the clothes as an object recognized from the first clothing image with the first reference values to analyze a type of the clothes such as a T-shirt, a blouse, a button-down shirt, a dress shirt, long pants, short pants, dress, swimsuit, and the like. This analysis is needed because different types of clothes require different operation modes (courses). In a selective embodiment, the clothes treating apparatus 100 may determine a type of clothes by using a deep neural network model which has been previously trained to identify the clothes from a clothing image and determine a type of the clothes. Further, the clothes treating apparatus 100 may compare, with the second reference values, a value digitalized from the shape of thread obtained by imaging the clothes recognized from the first clothing image at high magnification to analyze a material of the clothes such as wool, cotton, polyester, hemp cloth, cashmere, and the like, and may search for component information of each material stored in the memory 170. This analysis is needed because different materials and components of clothes require different operation modes (courses). In a selective embodiment, the clothes treating apparatus 100 may determine a material of clothes by using a deep neural network model which has been previously trained to identify clothes from a clothing image and determine a material of the clothes. Furthermore, the clothes treating apparatus 100 may compare, with the third reference values, a value digitalized from a portion with a different color or pattern in a magnified clothing image obtained by imaging the clothes recognized from the first clothing image at high magnification, in order to analyze a type of a contaminant such as coffee, kimchi liquid, dust, and the like, and the degree of contamination of the clothes, and may search for component information of each contaminant stored in the memory 170. This analysis is needed because different types of contaminants and different degrees of contamination of clothes require different operation modes (courses). In a selective embodiment, the clothes treating apparatus 100 may determine the degree of contamination of clothes by using a deep neural network model which has been previously trained to identify the clothes from a clothing image and determine the degree of contamination of the clothes.

In step S1130, the clothes treating apparatus 100 automatically sets an operation mode of the clothes treating apparatus 100 according to the result of analyzing the clothing image. The clothes treating apparatus 100 may automatically set an operation mode to be performed based on at least one among the results of analyzing a type of the clothes, a material of the clothes, and the degree of contamination of the clothes in the first clothing image. For example, when the clothes in the first clothing image are analyzed as a polyester dress shirt with dust, the clothes treating apparatus 100 may set an operation mode including strong steam, fine dust removal, and automatic drying.

In step S1140, the clothes treating apparatus 100 controls an operation according to the set operation mode. For example, if the clothes treating apparatus 100 sets the operation mode including strong steam, fine dust removal, and automatic drying, the clothes treating apparatus 100 may cause the steam generator 123 to generate steam for a predetermined period of time according to the strong steam and fine dust removal modes, and cause the hanger bar 112 to reciprocally move from side to side a predetermined number of times for a predetermined period of time, and also cause the ventilation fan 122 to operate for a predetermined period of time.

In a selective embodiment, the clothes treating apparatus 100 may automatically set a wash mode of the washing machine 500 interworking with the clothes treating apparatus 100 according to the result of analyzing the clothing image, and cause the washing machine 500 to operate according to the set wash mode. Further, the clothes treating apparatus 100 may automatically set a dry mode of the clothes dryer 600 interworking with the clothes treating apparatus 100 and the washing machine 500, and cause the clothes dryer 600 to operate according to the set dry mode.

Figure 12:
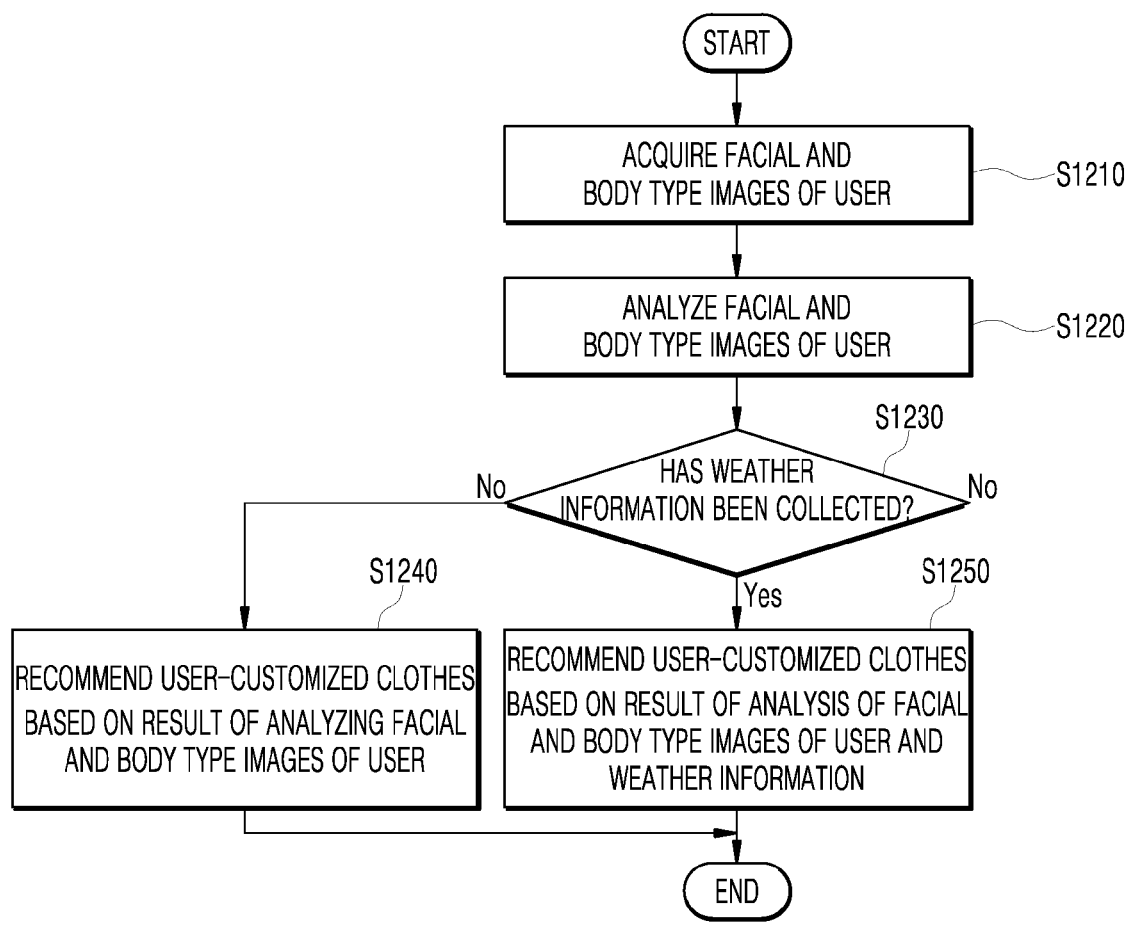

FIG. 12 is a flowchart showing a method for operating a clothes treating apparatus according to another embodiment of the present disclosure. Hereinafter, detailed descriptions of parts illustrated in FIG. 12 which overlap with those of FIG. 1 through FIG. 11 will be omitted.

Referring to FIG. 12, in step S1210, the clothes treating apparatus 100 acquires facial and body type images of the user photographed by the first image sensor 161. The clothes treating apparatus 100 may make a request to photograph the face of the user and a photo of the body of the user in response to a selected option, so as to recommend user-customized clothes displayed on the display unit 150. When the user is ready to be photographed, he or she says that he or she is ready to be photographed as a voice command. The clothes treating apparatus 100 may cause the first image sensor 161 to photograph the face of the user (in a front view and a side view) and the body of the user (in a front view and a side view), and the clothes treating apparatus 100 may acquire facial and body type images of the user photographed by the first image sensor 161.

In step S1220, the clothes treating apparatus 100 compares the acquired facial and body type images of the user with reference values so as to analyze the facial type and the body type of the user. Herein, the reference values may include facial type reference values such as an egg-shaped face reference value, a round face reference value, an angular face reference value, a longish face reference value, and an inverted triangle face reference value. Each of the facial type reference values may be the average for general users having a certain facial type and may be stored in the memory 170. Further, the reference values may include body type reference values such as a rectangular body reference value, a barrel-shaped body reference value, a box-shaped body reference value, or a pear-shaped body reference value. Each of the body type reference values may be the average for general users having a certain body type and may be stored in the memory 170. The clothes treating apparatus 100 may compare the facial type image of the user acquired by the second acquisition unit 185 with the facial type reference values to analyze the facial type of the user. Further, the clothes treating apparatus 100 may compare the body type image of the user with the body type reference values to analyze the body type of the user.

In step S1230, the clothes treating apparatus 100 determines whether weather information has been collected. The clothes treating apparatus 100 may collect weather information from a weather server that provides weather information, or may access the server 300 that stores weather information collected from the weather server and collect weather information. Herein, the weather information may include, for example, information on past, current, and future weather (for example, cloudy, clear, rainy, and snowy weather), temperature (for example, lowest temperature, highest temperature, and average temperature), season information (for example, spring, summer, fall, and winter), a fine dust index, a UV index, a humidity index, and an aridity index.

In step S1240, if the weather information is not collected, the clothes treating apparatus 100 receives the result of analyzing the facial and body type images of the user and recommends user-customized clothes. The clothes treating apparatus 100 may also recommend information about other fashion products (for example, shoes, bags, accessories, cosmetics, and the like) together with the user-customized clothes.

In step S1250, if the weather information is collected, the clothes treating apparatus 100 recommends user-customized clothes based on the result of analysis of the facial and body type images of the user and the weather information.

The above-described embodiments of the present disclosure may be implemented in the form of a computer program that may be executed through a variety of elements of a computer and recorded in a computer-readable recording medium. Examples of computer-readable recording media include magnetic media, such as a hard disk, a floppy disk, and a magnetic tape, optical recording media, such as compact disc-read only memory (CD-ROM) and a digital versatile disc (DVD), magneto-optical media, such as a floptical disk, and hardware devices, such as a ROM, random access memory (RAM), and a flash memory, specially constructed to store and execute a program command.

The computer program may be designed and configured specifically for the present disclosure or may be publicly known and available to those skilled in the field of computer software. Examples of the computer program may include machine language codes created by a compiler and high-level language codes that can be executed by the computer using an interpreter or the like.

As used in the specification (particularly claims), the term "the" and other similar articles may include both singular and plural forms. Further, (unless otherwise defined), the ranges defined herein are intended to include any embodiments to which values within the range are individually applied and may be considered to be the same as individual values constituting the ranges in the detailed description of the present disclosure.

The steps constituting the method according to the present disclosure may be performed in appropriate order unless explicitly described in terms of order or described to the contrary. The present disclosure is not necessarily limited to the order of steps given in the description. The examples or exemplary terms ("for example", "such as", "and the like".) used in the present disclosure are to merely describe exemplary embodiments in detail and not intended to limit the scope and spirit of the present disclosure unless defined by the following claims. Also, those skilled in the art will readily appreciate that many alternations, combinations, and modifications may be made according to design conditions and factors within the scope of the appended claims and their equivalents.

Therefore, the scope of the present disclosure is defined not by the detailed description, but by the claims and their equivalents, and all variations within the scope of the claims and their equivalents are to be construed as being included in the present disclosure.

What is claimed is:

1. A method for operating a clothes treating apparatus, the method comprising:
    acquiring, by a camera, provided at an outer surface of a door of the clothes treating apparatus, a clothing image corresponding to a user that wears clothes and that is located in front of a mirror display, the mirror display being located at a front surface of the clothes treating apparatus;
    analyzing the clothing image;
    setting an operation mode of the clothes treating apparatus according to a result of analyzing the clothing image; and
    causing the clothes treating apparatus to perform an operation according to the operation mode,
    wherein the operation includes (i) generating steam, (ii) moving a hanger bar included in the clothes treating apparatus, or (iii) operating a ventilation fan included in the clothes treating apparatus.

2. The method of claim 1, wherein acquiring the clothing image comprises:
    determining whether the user is facing the clothes treating apparatus; and
    capturing an image of the user based on a determination that the user has been facing the clothes treating apparatus for a predetermined period of time or more.

3. The method of claim 2, wherein determining whether the user faces the clothes treating apparatus comprises determining whether the user faces the clothes treating apparatus based on detection of the user's face.

4. The method of claim 1, wherein:
    analyzing the clothing image comprises determining a type of the clothes from the clothing image by a deep neural network model that is pre-trained to identify the clothes from the clothing image and determine the type of the clothes, and
    setting the operation mode comprises setting the operation mode according to the type of the clothes.

5. The method of claim 1, wherein:
    analyzing the clothing image comprises determining a material of the clothes from the clothing image by a deep neural network model that is pre-trained to identify the clothes from the clothing image and determine the material of the clothes, and
    setting the operation mode comprises setting the operation mode according to the material of the clothes.

6. The method of claim 1, wherein:
    analyzing the clothing image comprises determining a degree of contamination of the clothes from the clothing image by a deep neural network model that is pre-trained to identify the clothes from the clothing image and determine the degree of contamination of the clothes, and
    setting the operation mode comprises setting the operation mode according to the degree of contamination of the clothes.

7. The method of claim 1, wherein setting the operation mode comprises setting a wash mode of a washing machine that is configured to communicate with the clothes treating apparatus and to wash the clothes according to the result of analyzing the clothing image.

8. The method of claim 7, wherein setting the operation mode further comprises setting a dry mode of a clothes dryer that is configured to communicate with the clothes treating apparatus and the washing machine and to dry the clothes taken out of the washing machine according to the result of analyzing the clothing image.

9. The method of claim 1, further comprising:
    acquiring one or more images of the user corresponding to a facial type and a body type of the user;
    analyzing the one or more images of the user; and
    recommending user-customized clothes based on a result of analyzing the one or more images of the user.

10. The method of claim 9, further comprising collecting weather information,
    wherein recommending the user-customized clothes comprises recommending the user-customized clothes based on the result of analyzing the one or more images of the user and the weather information.

11. A clothes treating apparatus, comprising:
a mirror display located at a front surface of the clothes treating apparatus; and
one or more processors configured to:
acquire, by a camera provided at an outer surface of a door of the clothes treating apparatus, a clothing image corresponding to a user that wears clothes and that is located in front of the mirror display,
analyze the clothing image,
set an operation mode of the clothes treating apparatus according to a result of analyzing the clothing image, and
cause the clothes treating apparatus to perform an operation according to the operation mode,
wherein the operation includes (i) generating steam, (ii) moving a hanger bar included in the clothes treating apparatus, or (iii) operating a ventilation fan included in the clothes treating apparatus.

12. The clothes treating apparatus of claim 11, wherein the one or more processors are configured to:
determine whether the user is facing the clothes treating apparatus, and
capture an image of the user based on a determination that the user has been facing the clothes treating apparatus for a predetermined period of time or more.

13. The clothes treating apparatus of claim 12, wherein the one or more processors are configured to determine whether the user is facing the clothes treating apparatus based on detection of the user's face.

14. The clothes treating apparatus of claim 11, wherein the one or more processors are configured to:
determine a type of the clothes from the clothing image by a deep neural network model that is pre-trained to identify the clothes from the clothing image and determine the type of the clothes, and
set the operation mode according to the type of the clothes.

15. The clothes treating apparatus of claim 11, wherein the one or more processors are configured to:
determine a material of the clothes from the clothing image by a deep neural network model that pre-trained to identify the clothes from the clothing image and determine the material of the clothes, and
set the operation mode according to the material of the clothes.

16. The clothes treating apparatus of claim 11, wherein the one or more processors are configured to:
determine a degree of contamination of the clothes from the clothing image by a deep neural network model that is pre-trained to identify the clothes from the clothing image and determine the degree of contamination of the clothes, and
set the operation mode of the clothes treating apparatus according to the degree of contamination of the clothes.

17. The clothes treating apparatus of claim 11, wherein the one or more processors are configured to:
set a wash mode of a washing machine that is configured to communicate with the clothes treating apparatus and to wash the clothes according to the result of analyzing the clothing image.

18. The clothes treating apparatus of claim 17, wherein the one or more processors are configured to:
set a dry mode of a clothes dryer that is configured to communicate with the clothes treating apparatus and the washing machine and to dry the clothes taken out of the washing machine according to the result of analyzing the clothing image.

19. The clothes treating apparatus of claim 11, wherein the one or more processors are configured to:
acquire one or more images of the user corresponding to a facial type and a body type of the user,
analyzes the one or more images of the user, and
recommend user-customized clothes based on a result of analyzing the one or more images of the user.

20. The clothes treating apparatus of claim 19, wherein the one or more processors are configured to:
collect weather information, and
recommend the user-customized clothes based on the result of analyzing the one or more images of the user and the weather information.

* * * * *